(12) United States Patent
Kim et al.

(10) Patent No.: US 11,984,667 B2
(45) Date of Patent: May 14, 2024

(54) ANTENNA AND ELECTRONIC DEVICE COMPRISING SAME

(71) Applicant: Samsung Electronics Co., Ltd., Gyeonggi-do (KR)

(72) Inventors: Junwoo Kim, Gyeonggi-do (KR); Hojung Nam, Gyeonggi-do (KR); Chankyu An, Gyeonggi-do (KR); Sungkoo Park, Gyeonggi-do (KR); Cheolhong Son, Gyeonggi-do (KR); Soonho Hwang, Gyeonggi-do (KR)

(73) Assignee: Samsung Electronics Co., Ltd (KR)

(*) Notice: Subject to any disclaimer, the term of this patent is extended or adjusted under 35 U.S.C. 154(b) by 323 days.

(21) Appl. No.: 17/406,672

(22) Filed: Aug. 19, 2021

(65) Prior Publication Data

US 2021/0384630 A1 Dec. 9, 2021

Related U.S. Application Data

(63) Continuation of application No. PCT/KR2020/002378, filed on Feb. 19, 2020.

(30) Foreign Application Priority Data

Feb. 19, 2019 (KR) .................. 10-2019-0019541

(51) Int. Cl.
*H01Q 5/50* (2015.01)
*H01Q 1/24* (2006.01)
*H04M 1/02* (2006.01)

(52) U.S. Cl.
CPC .............. *H01Q 5/50* (2015.01); *H01Q 1/243* (2013.01); *H04M 1/0266* (2013.01); *H04M 1/0277* (2013.01)

(58) Field of Classification Search
CPC ................. H01Q 1/243; H01Q 1/38; H01Q 1/44; H01Q 1/46; H01Q 5/35; H01Q 5/371;
(Continued)

(56) References Cited

U.S. PATENT DOCUMENTS 10,075,569 B2   9/2018  Kim et al.
10,306,029 B1*  5/2019  Hwang .............. H04M 1/0202
(Continued)

FOREIGN PATENT DOCUMENTS

KR    10-2017-0119392    4/2016
KR    10-2018-0108147    10/2018
WO    WO 2018/139692    8/2018

OTHER PUBLICATIONS

Korean Office Action dated Feb. 24, 2023 issued in counterpart application No. 10-2019-0019541, 11 pages.
(Continued)

*Primary Examiner* — Raymond R Chai
(74) *Attorney, Agent, or Firm* — The Farrell Law Firm, P.C.

(57) ABSTRACT

An electronic device including an improved antenna structure is provided. The electronic device includes an antenna structure including a side surface member including first to fifth conductive parts, a first to fifth insulation part between the conductive parts. The electronic device includes a display and a wireless communication circuit electrically connected with the first to the fifth conductive parts, and configured to transceive in a designated frequency band. The second conductive part includes a feeding structure that at least partially overlaps the display in within a predetermined distance of the first insulation part, and is electrically connected with the wireless communication circuit.

16 Claims, 30 Drawing Sheets

(58) Field of Classification Search
CPC . H01Q 5/50; H01Q 9/42; H01Q 21/28; H04B 1/00; H04B 1/0064; H04M 1/0249; H04M 1/026; H04M 1/0266; H04M 1/0277
See application file for complete search history.

(56) References Cited

U.S. PATENT DOCUMENTS

| | | | |
|---|---|---|---|
| 11,258,163 B2* | 2/2022 | Froese | H04B 7/10 |
| 2017/0302771 A1* | 10/2017 | Kim | H01Q 9/42 |
| 2018/0219276 A1 | 8/2018 | Han et al. | |
| 2018/0277934 A1 | 9/2018 | Kim et al. | |
| 2018/0323497 A1 | 11/2018 | Kang et al. | |
| 2019/0312333 A1* | 10/2019 | Kim | H01Q 9/42 |
| 2020/0076056 A1* | 3/2020 | Froese | H01Q 21/28 |
| 2021/0021018 A1* | 1/2021 | Yoon | H01Q 1/243 |
| 2021/0175922 A1 | 6/2021 | Jung et al. | |

OTHER PUBLICATIONS

PCT/ISA/210 Search Report issued on PCT/KR2020/002378 pp. 3.
PCT/ISA/237 Written Opinion issued on PCT/KR2020/002378 pp. 5.
KR Notice of Patent Grant dated Aug. 25, 2023 issued in counterpart application No. 10-2019-0019541, 5 pages.

* cited by examiner

ANTENNA AND ELECTRONIC DEVICE COMPRISING SAME

CROSS-REFERENCE TO RELATED APPLICATION(S)

This application is a bypass continuation application of International Application No. PCT/KR2020/002378, which was filed on Feb. 19, 2020, and is based on and claims priority under 35 U.S.C. § 119 to Korean Patent Application No. 10-2019-0019541, which was filed in the Korean Intellectual Property Office on Feb. 19, 2019, the entire disclosure of each of which is incorporated herein by reference.

BACKGROUND

1. Field

The disclosure relates generally to an antenna and an electronic device including the same.

2. Description of Related Art

With the development of electronic communication technology, electronic devices provided with various functions are coming into the market. Further, as the gap in functions between manufacturers of electronic devices is noticeably narrowing, electronic devices are becoming slimmer, while enhancing design aspects in order to meet consumer buying needs.

An electronic device may include a housing of a metallic material for increased durability and an aesthetic property. Additionally, at least a part of the metal housing may be implemented as an antenna radiator in order to ensure antenna radiation performance of the electronic device. However, a gap between electric elements (or electric structures) is gradually narrowing due to the trend toward slimness of electronic devices, and accordingly, an antenna device utilizing at least a part of the housing may have difficulty in forming one or more resonant frequencies in a selected or designated frequency band or a wide band.

SUMMARY

The disclosure has been made to address the above-mentioned problems and disadvantages, and to provide at least the advantages described below.

An aspect of the disclosure it to provide an antenna that can form one or more resonant frequencies in a selected or designated frequency band or a wideband through a housing of a metallic material, and to provide an electronic device including the same.

In accordance with an aspect of the disclosure, an electronic device is provided. The electronic device includes an antenna structure including a side surface member including a first conductive part, a second conductive part, a third conductive part, a fourth conductive part, and a fifth conductive part, which at least partially surround a space between a first surface and a second surface facing in the opposite directions, a first insulation part between the first conductive part and the second conductive part, a second insulation part between the second conductive part and the third conductive part, a third insulation part between the third conductive part and the fourth conductive part, a fourth insulation part between the fourth conductive part and the fifth conductive part, and a fifth insulation part between the first conductive part and the fifth conductive part. The first conductive part forms a part of a first side surface facing in a first direction and a part of a third side surface facing in a third direction perpendicular to the first direction, the second conductive part forms a part of the third side surface and a part of a second side surface facing in a second direction opposite to the first direction, the third conductive part forms a part of the second side surface, the fourth conductive part forms a part of the second side surface and a part of a fourth side surface facing in a fourth direction opposite to the third direction, and the fifth conductive part forms a part of the first side surface and a part of the fourth side surface. The electronic device further include a display disposed between the first surface and the second surface and is exposed through the first surface, and a wireless communication circuit electrically connected with the first conductive part, the second conductive part, the third conductive part, the fourth conductive part, and the fifth conductive part, and configured to transceive signals in a designated frequency band. The second conductive part includes a feeding structure that at least partially overlaps the display within a predetermined distance of the first insulation part, when viewed above the first surface, and is electrically connected with the wireless communication circuit.

In accordance with another aspect of the disclosure, an electronic device is provided. The electronic device includes an antenna structure including a side surface member including a first conductive part, a second conductive part, a third conductive part, a fourth conductive part, and a fifth conductive part, which at least partially surround a space between a first surface and a second surface facing in the opposite directions, a first insulation part between the first conductive part and the second conductive part, a second insulation part between the second conductive part and the third conductive part, a third insulation part between the third conductive part and the fourth conductive part, a fourth insulation part between the fourth conductive part and the fifth conductive part, and a fifth insulation part between the first conductive part and the fifth conductive part. The first conductive part forms a part of a first side surface facing in a first direction and a part of a third side surface facing in a third direction, which is perpendicular to the first direction, the second conductive part forms a part of the third side surface and a part of a second side surface facing in a second direction, which is opposite to the first direction, the third conductive part forms a part of the second side surface, the fourth conductive part forms a part of the second side surface and a part of a fourth side surface facing in a fourth direction, which is opposite to the third direction, and the fifth conductive part forms a part of the first side surface and a part of the fourth side surface. The electronic device further includes a display disposed between the first surface and the second surface and being exposed through the first surface, and a wireless communication circuit configured to select four conductive parts from among the first conductive part, the second conductive part, the third conductive part, the fourth conductive part, and the fifth conductive part, and receive a designated frequency signal through the four selected conductive parts.

BRIEF DESCRIPTION OF DRAWINGS

The above and other aspects, features, and advantages of certain embodiments of the disclosure will be more apparent from the following description taken in conjunction with the accompanying drawings, in which.

DETAILED DESCRIPTION

Various embodiments of the disclosure are described below with reference to the accompanying drawings. In the following description, specific details such as detailed configuration and components are merely provided to assist the overall understanding of these embodiments. Therefore, it should be apparent to those skilled in the art that various changes and modifications of the embodiments described herein can be made without departing from the scope and spirit of the disclosure. In addition, descriptions of well-known functions and constructions are omitted for clarity and conciseness.

Figure 1:
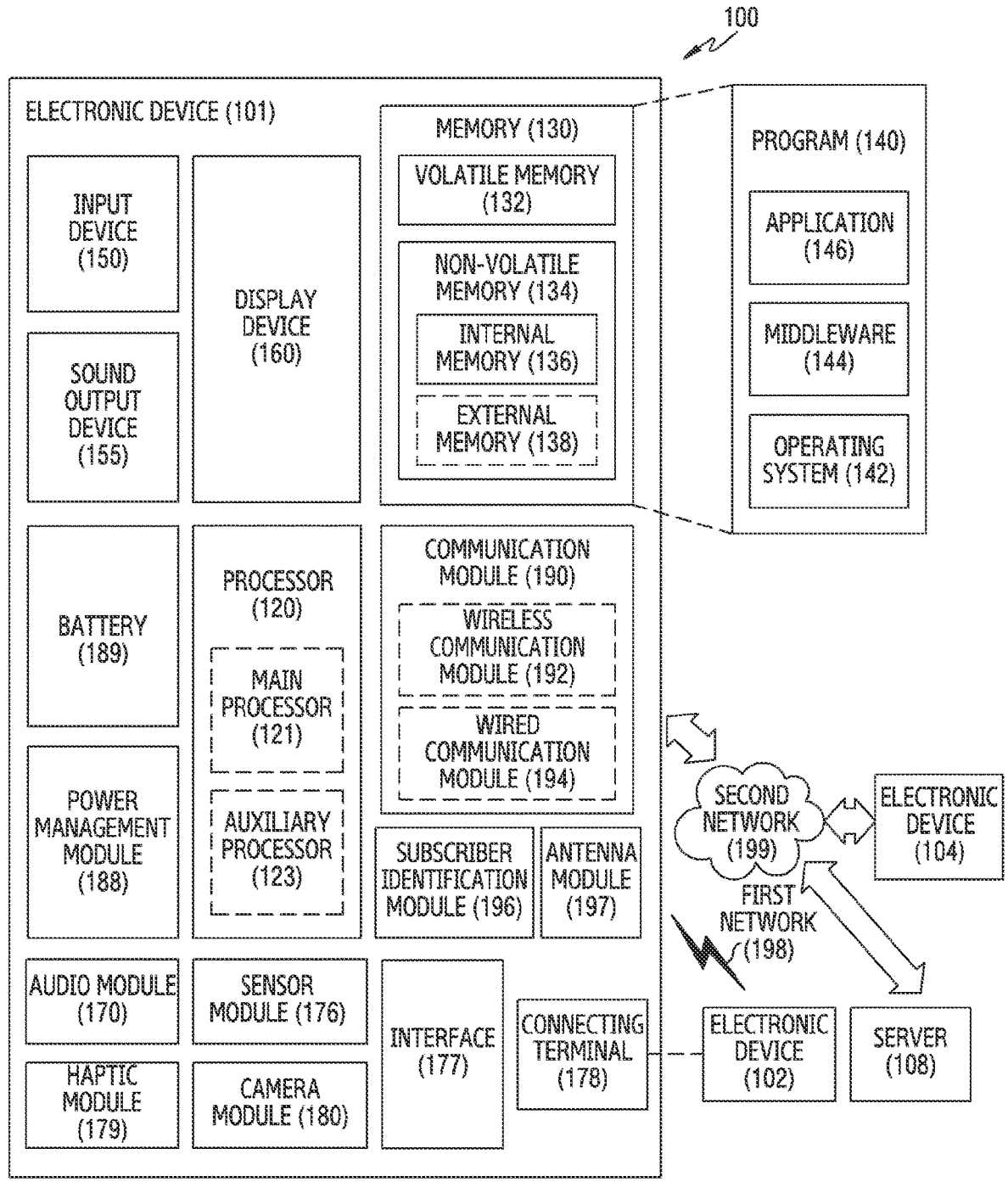
FIG. 1 illustrates an electronic device in a network environment according to an embodiment.

FIG. 1 illustrates an electronic device 101 in a network environment 100 according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally, or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high-definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or IR data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment.

With regard to the description of the drawings, similar reference numerals may be used to refer to similar or related elements.

It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. One or more of the above-described components may be omitted, or one or more other components may be added. Alternatively, or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 2A:
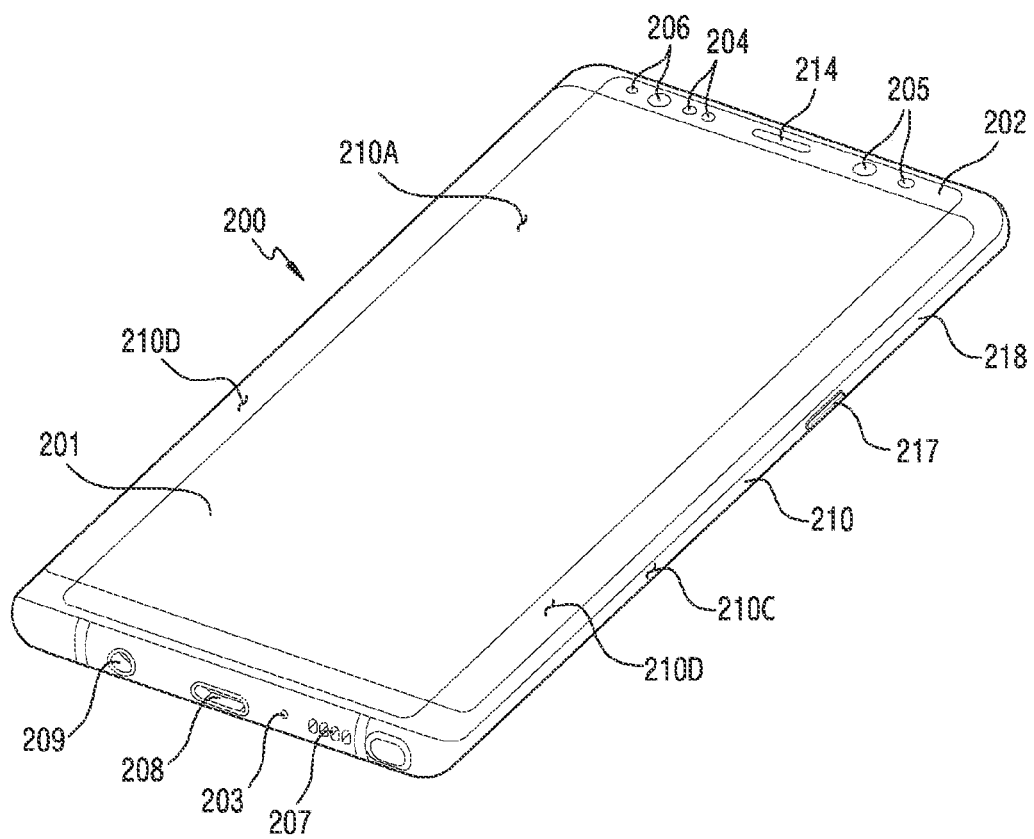
FIG. 2A illustrates a front surface of a mobile device according to an embodiment.
Figure 2B:
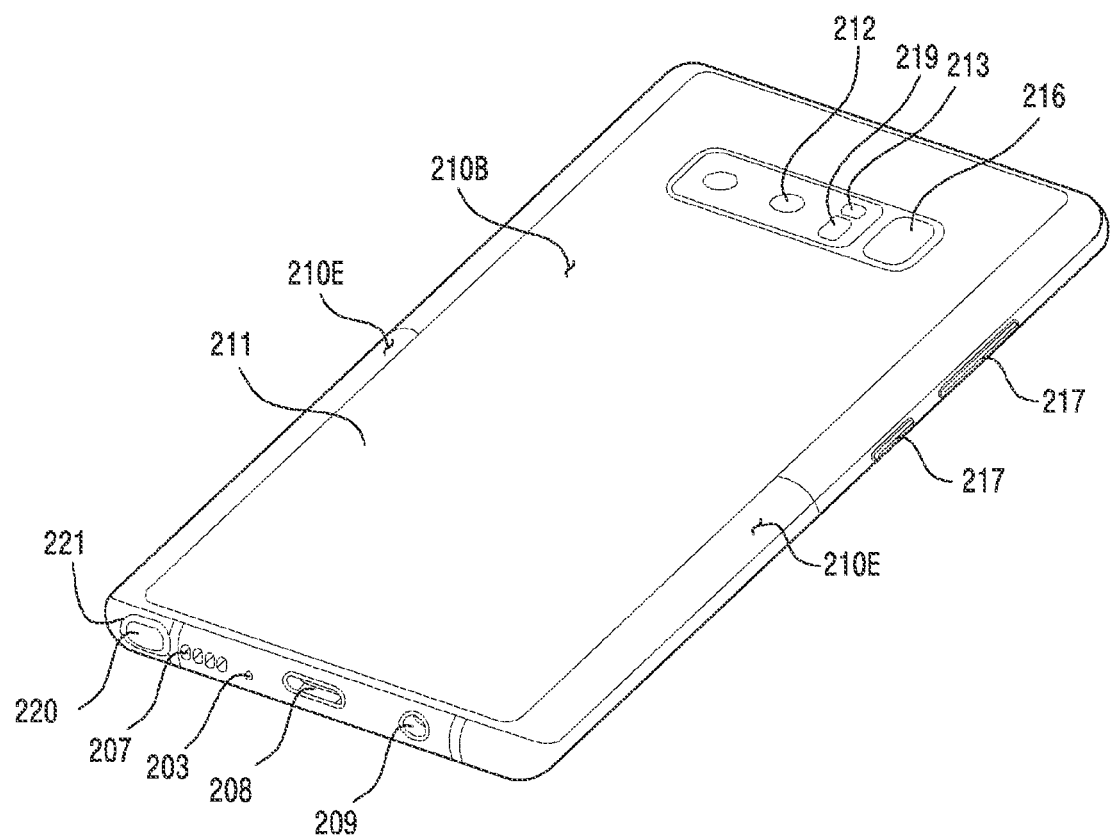
FIG. 2B illustrates a rear surface of the electronic device of FIG. 2A according to an embodiment.

FIG. 2A illustrates a front surface of a mobile device according to an embodiment, and FIG. 2B illustrates a rear surface of the electronic device of FIG. 2A, according to an embodiment.

Referring to FIGS. 2A and 2B, the electronic device 200 includes a housing 210 including a first surface (or a front surface) 210A, a second surface (or a rear surface) 210B, and a side surface 210C enclosing a space between the first surface 210A and the second surface 210B. Alternatively, the housing may refer to a structure that forms a portion of the first surface 210A, the second surface 210B and the side surface 210C of FIG. 2A.

The first surface 210A may be formed by a front surface plate 202 (e.g., a glass plate including various coating layers or a polymer plate) having at least a portion substantially transparent. The second surface 210B may be formed by a rear surface plate 211 which is substantially opaque. The rear surface plate 211 may be formed by coated or colored glass, ceramic, a polymer, metal (e.g., aluminum, stainless steel (STS), or magnesium), or a combination of at least two of the above-mentioned materials. The side surface 210C may be formed by a side surface bezel structure (or a "side surface member") 218, which is coupled with the front surface plate 202 and the rear surface plate 211, and includes metal and/or a polymer. The rear surface plate 211 and the side surface bezel structure 218 may be integrally formed with each other, and may include the same material (e.g., a metallic material such as aluminum).

The front surface plate 202 includes two first areas 210D on long edge both ends of the front surface plate 202, the two first areas 210D being bent from the first surface 210A toward the rear surface plate 211 and being seamlessly extended. In FIG. 2B, the rear surface plate 211 includes two second areas 210E on long edge both ends, the two second areas 210E being bent from the second surface 210B toward the front surface plate 202 and being seamlessly extended. Alternatively, the front surface plate 202 (or the rear surface plate 211) may include only one of the first areas 210D (or the second areas 110E). As yet another alternative, some of the first areas 210D or the second areas 210E may be omitted.

When viewed from the side surface of the electronic device 200, the side surface bezel structure 218 may have a first thickness (or width) on a side surface that does not include the first areas 210D or the second areas 210E described above, and may have a second thickness thinner than the first thickness on a side surface that includes the first areas 210D or the second areas 210E.

The electronic device 200 includes a display 201, audio modules 203, 207, and 214, sensor modules 204, 216, and 219, camera modules 205, 212, and 213, key input devices 217, a light emitting element 206, a pen input device 220, and connector holes 208 and 209. Alternatively, the electronic device 200 may omit at least one of the illustrated components (e.g., the key input devices 217 or the light emitting element 206) and/or may include additional components.

The display 201 may be exposed through a substantial portion of the front surface plate 202. At least a portion of the display 201 may be exposed through the front surface plate 202 which forms the first surface 210A and the first areas 210D of the side surface 210C. An edge of the display 201 may be formed substantially the same as a shape of a border of the front surface plate 102 that is adjacent to the display. Alternatively, a gap between the border of the display 201 and the border of the front surface plate 202 may be formed substantially the same to extend an exposed area of the display 201.

A recess or an opening may be formed on a portion of a screen display area of the display 201, and the electronic device 200 may include at least one of the audio module 214, the sensor module 204, the camera module 205, and the light emitting element 206 that is aligned with the recess or the opening. The electronic device 200 may include at least one of the audio module 214, the sensor module 204, the camera module 205, the fingerprint sensor 216, or the light emitting element 206 on a rear surface of the screen display area of the display 201. Alternatively, the display 201 may be coupled with or disposed adjacent to a touch detection circuitry, a pressure sensor for measuring an intensity (pressure) of a touch, and/or a digitizer for detecting a stylus pen of a magnetic field method. In a certain embodiment, at least a portion of the sensor modules 204, 219, and/or at least a portion of the key input devices 217 may be disposed on the first areas 210D and/or the second areas 210E.

The audio modules 203, 207, and 214 may include a microphone hole 203 and speaker holes 207 and 214. The microphone hole 203 may have a microphone disposed therein to acquire an external sound, and the microphone hole 203 may have a plurality of microphones disposed therein to detect a direction of a sound. The speaker holes 207 and 214 may include an external speaker hole 207 or a receiver hole 214 for communication. The speaker holes 207 and 214 and the microphone hole 203 may be implemented by one hole, or a speaker may be included without the speaker holes 207 and 214 (e.g., a piezo speaker).

The sensor modules 204, 216, and 219 may generate an electric signal or a data value corresponding to an internal operation state or an external environment state of the electronic device 200. The sensor modules 204, 216, and 219 may include a first sensor module 204 (e.g., a proximity sensor), a second sensor module (e.g., a fingerprint sensor) disposed on the first surface 210A of the housing 210, a third sensor module 219 (e.g., a heart rate monitor (HRM) sensor) and/or a fourth sensor module 216 (e.g., a fingerprint sensor) disposed on the second surface 210B of the housing 210. The fingerprint sensor may be disposed on the first surface 210A (e.g., the display 101) of the housing 210 and also on the second surface 110B. The electronic device 200 may other sensor modules, such as a gesture sensor, a gyro sensor, an atmospheric pressure sensor, a magnetic sensor, an acceleration sensor, a grip sensor, a color sensor, an IR sensor, a biometric sensor, a temperature sensor, a humidity sensor, and/or an illuminance sensor 204.

The camera modules 205, 212, and 213 may include a first camera device 205 disposed on the first surface 210A of the electronic device 200, and a second camera device 212 disposed on the second surface 210B, and/or a flash 213. The first camera device 205 and the second camera device 212 may include one lens or a plurality of lenses, an image sensor, and/or an ISP. The flash 213 may include a light emitting diode (LED) or a xenon lamp. Alternatively, two or more lenses (e.g., an IR camera, a wide angle lens, and a telephoto lens) and image sensors may be disposed on one surface of the electronic device 200.

The key input device 217 may be disposed on the side surface 210C of the housing 210. Alternatively, the electronic device 200 may omit a portion or an entirety of the above-mentioned key input devices 217, and the key input devices 217 that are omitted may be implemented on the display 201 in other forms, such as a soft key. The key input device may include the sensor module 216 disposed on the second surface 210B of the housing 210.

The light emitting element 206 may be disposed on the first surface 210A of the housing 210. The light emitting element 206 may provide state information of the electronic device 200 in the form of light. The light emitting element 206 may provide a light source that interlocks with an operation of the camera module 205. The light emitting element 206 may include an LED, an IR LED, a xenon lamp, etc.

The connector holes 208 and 209 may include a first connector hole 208 for accommodating a connector (e.g., a USB connector) for transmitting and receiving power and/or data to and from an external electronic device, and/or a second connector hole (e.g., an earphone jack) 209 for accommodating a connector for transmitting and receiving an audio signal to and from an external electronic device.

The pen input device 220 (e.g., a stylus pen) may be guided and inserted into the housing 210 or may be dismounted therefrom through a hole 221 form on a side surface of the housing 210, and may include a button for easy mounting and dismounting. The pen input device 220 may have a separate resonance circuit embedded therein to interlock with an electromagnetic induction panel (e.g., a digitizer) included in the electronic device 200. The pen input device 220 may include an electromagnetic resonance (EMR) method, an active electrical stylus (AES) or electric coupled resonance (ECR) method.

Figure 3:
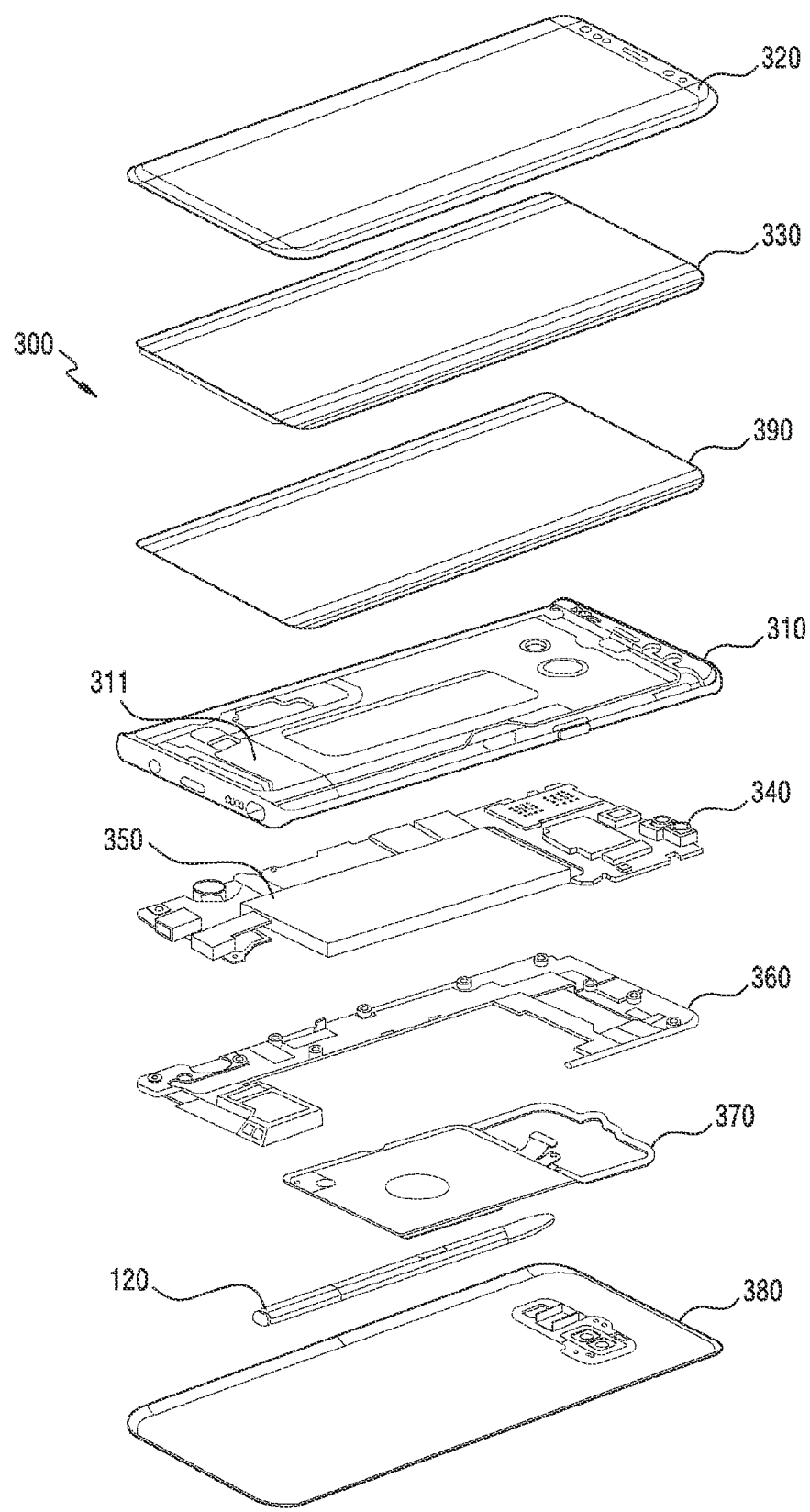
FIG. 3 illustrates an exploded perspective view of an electronic device according to an embodiment.

FIG. 3 illustrates an exploded perspective view of an electronic device according to an embodiment.

Referring to FIG. 3, an electronic device 300 includes a side surface bezel structure 310, a first support member 311 (e.g., a bracket), a front surface plate 320, a display 330, an electromagnetic induction panel 390, a PCB 340, a battery 350, a second support member 360 (e.g., a rear case), an antenna 370, a pen input device 120, and a rear surface plate 380. Alternatively, the electronic device 300 may omit at least one of the illustrated components (e.g., the first support member 311, the second support member 360, or the electromagnetic induction panel 390 and the pen input device 120), and/or may include additional components.

The electromagnetic induction panel 390 (e.g., a digitizer) may detect an input of a pen input device (e.g., the pen input device 220 of FIG. 2B). The electromagnetic induction panel 390 may include a PCB (e.g., a flexible PCB (FPCB)) and a shield sheet. The shield sheet can prevent interference between components, caused by an electromagnetic field generated from components (e.g., the display module, the PCB, the electromagnetic induction panel, etc.) included in the electronic device 300. The shield sheet may allow an input from the pen input device to be transmitted to a coil included in the electromagnetic induction panel 390, while blocking the electromagnetic field generated from the components. The electromagnetic induction panel 390 may include an opening formed on at least some area corresponding to a biometric sensor mounted in the electronic device 300.

The first support member 311 may be disposed in the electronic device 300 and may be connected with the side surface bezel structure 310, or may be integrally formed with the side surface bezel structure 310. The first support member 311 may be formed by a metallic material and/or a nonmetallic material (e.g., a polymer). The first support member 311 may have one surface coupled to the display 330 and the other surface coupled to the PCB 340. The PCB 340 may have a processor, a memory, and/or an interface mounted thereon. The processor may include one or more of a CPU, an AP, a GPU, an ISP, a sensor hub processor, or a CP.

The memory may include a volatile memory or a non-volatile memory.

The interface may include an HDMI, a USB interface, an SD card interface, and/or an audio interface. The interface may electrically or physically connect the electronic device 300 to an external electronic device, and may include a USB connector, an SD card/multimedia card (MMC) connector, or an audio connector.

The battery 350 supplies power to at least one component of the electronic device 300, and may include a primary battery that is not rechargeable, a rechargeable secondary battery, and/or a fuel cell. At least a portion of the battery 350 may be disposed on substantially the same plane as the PCB 340. The battery 350 may be integrally disposed in the electronic device 300, or may be disposed to be attachable to and detachable from the electronic device 300.

The antenna 370 may be disposed between the rear surface plate 380 and the battery 350. The antenna 370 may include a near field communication (NFC) antenna, a wireless charging antenna, and/or a magnetic secure transmission (MST) antenna. The antenna 370 may remotely communicate with an external device or may wirelessly transmit and receive power necessary for charging. An antenna structure may be formed by a portion or a combination of the side surface bezel structure 310 and/or the first support member 311.

Figure 4:
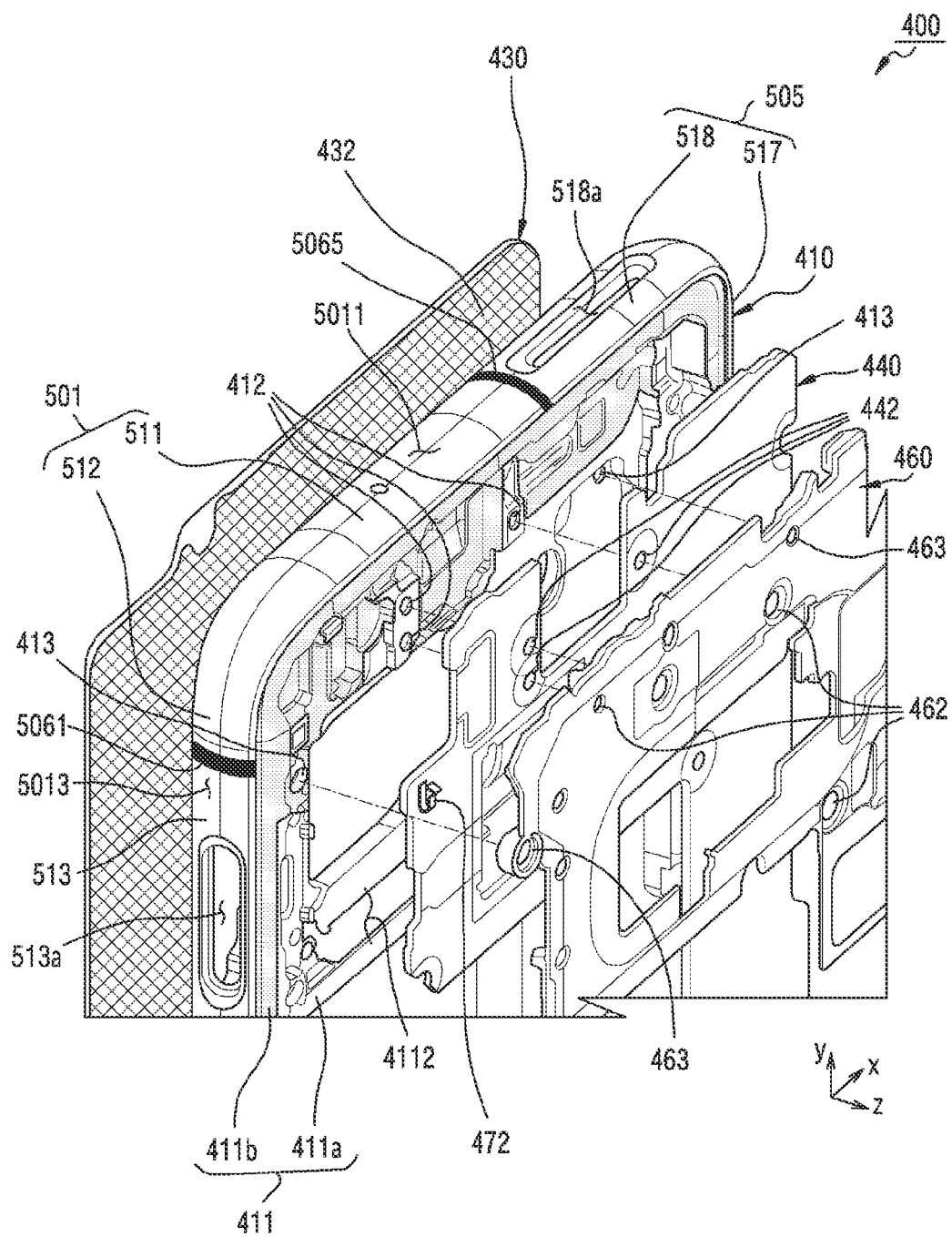
FIG. 4 illustrates an exploded perspective view of an electronic device according to an embodiment.

FIG. 4 illustrates an exploded perspective view of an electronic device according to an embodiment.

Referring to FIG. 4, an electronic device 400 includes a side surface member 410, a first support member 411, a display 430, a PCB 440, and a second support member 460.

Figure 5:
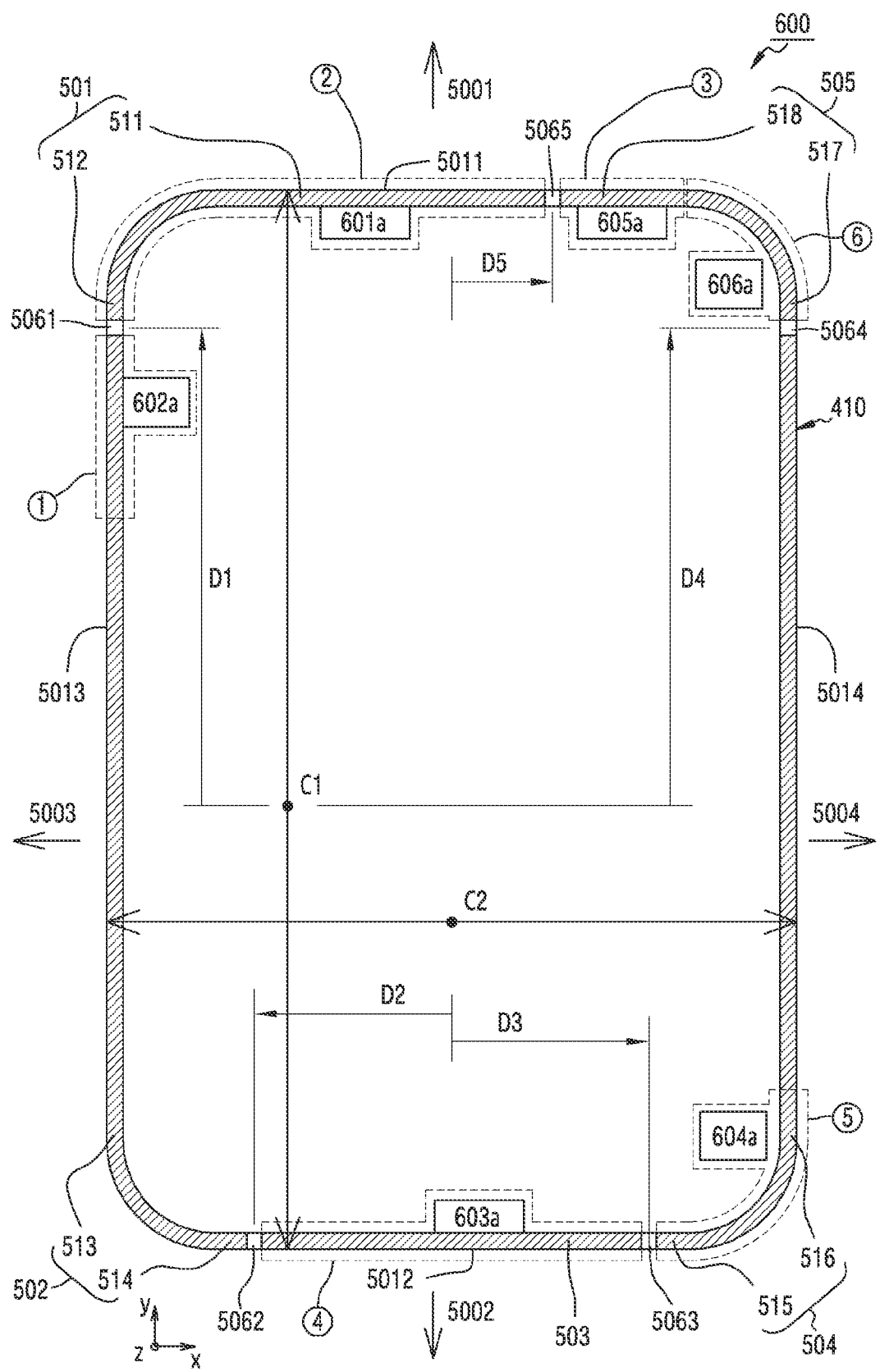
FIG. 5 illustrates an antenna structure according to an embodiment.

FIG. 5 schematically illustrates an antenna structure according to an embodiment.

Referring to FIGS. 4 and 5, the side surface member 410 includes a first side surface 5011 facing in a first direction 5001 (e.g., +y-axis direction), a second side surface 5012 facing in a second direction 5002 (e.g., −y-axis direction), which is opposite to the first direction 5001, a third side surface 5013 facing in a third direction 5003 (e.g., −x-axis direction), which is perpendicular to the first direction 5001, and a fourth side surface 5014 facing in a fourth direction 5004 (e.g., +x-axis direction), which is opposite to the third direction 5003.

The side surface member 410 includes a first outer conductive part 501, a second outer conductive part 502, a third outer conductive part 503, a fourth outer conductive part 504, and a fifth outer conductive part 505. The first outer conductive part 501 includes a first part 511 forming a part of the first side surface 5011, and a second part 512 forming a part of the third side surface 5013. The second outer conductive part 502 includes a third part 513 forming a part of the third side surface 5013, and a fourth part 514 forming a part of the second side surface 5012. The third outer conductive part 503 forms a part of the second side surface 5012. The fourth outer conductive part 504 includes a fifth part 515 forming a part of the second side surface 5012, and a sixth part 516 forming a part of the fourth side surface 5014. The fifth outer conductive part 505 includes a seventh part 517 forming a part of the fourth side surface 5014, and an eighth part 518 forming a part of the first side surface 5011. A connection part (or a corner) between the first part 511 and the second part 512, a connection part between the third part 513 and the fourth part 514, a connection part between the fifth part 515 and the sixth part 516, and/or a connection part between the seventh part 517 and the eighth part 518 may be formed by a curved corner or a rounded corner.

Referring again to FIG. 4, the third part 513 of the second outer conductive part 502 includes a penetrating hole 513a for a key input device to be disposed therein (e.g., the key input device 217 of FIG. 2A). Similarly, the eighth part 518 of the fifth outer conductive part 505 includes a penetrating hole 518a to have a memory card inserted thereinto.

Referring again to FIGS. 4 and 5, an antenna structure 600 (or the side surface member 410) includes a first insulation part 5061 disposed between the first and second outer conductive parts 501 and 502, a second insulation part 5062 disposed between the second and third outer conductive parts 502 and 503, a third insulation part 5063 disposed between the third and fourth outer conductive parts 503 and 504, a fourth insulation 5064 disposed between the fourth and fifth conductive parts 504 and 505, and a fifth insulation part 5065 disposed between the first and fifth outer conductive parts 501 and 505. The first insulation part 5061 may form a part of the third side surface 5013, and the second insulation part 5062 and the third insulation part 5063 may form a part of the second side surface 5012. The fourth insulation part 5064 may form a part of the fourth side surface 5014, and the fifth insulation part 5065 may form a part of the first side surface 5011. Alternatively, the first insulation part 5061, the second insulation part 5062, the third insulation part 5063, the fourth insulation part 5064, and/or the fifth insulation part 5065 may be included in the first support member 411 of FIG. 4.

The first insulation part 5061 may be spaced apart from a first center C1 between the first side surface 5011 and the second side surface 5012 by a first distance D1 in the first direction 5001. The second insulation part 5062 may be spaced apart from a second center C2 between the third side surface 5013 and the fourth side surface 5014 by a second distance D2 in the third direction 5003. The third insulation part 5063 may be spaced apart from the second center C2 by a third distance D3 in the fourth direction 5004. The fourth insulation part 5064 may be spaced apart from the first center C1 by a fourth distance D4 in the first direction 5001. The fifth insulation part 5065 may be spaced apart from the second center C2 by a fifth distance D5 in the fourth direction 5004. The first distance D1 and the second distance D2 may be substantially the same, or the first distance D1 and the second distance D2 may be formed differently. The second distance D2 and the third distance D3 may be substantially the same, or the second distance D2 and the third distance D3 may be formed differently. The fifth distance D5 may be shorter than the third distance D3, or the fifth distance D5 may be formed substantially the same as the third distance D3.

The first support member 411 may be disposed inside the electronic device 400 to be connected with the side surface member 410 or to be integrally formed with the side surface member 410. The first support member 411 may include an inner conductive part 411a formed with a metallic material and/or a nonconductive part 411b formed with a non-metallic material (e.g., polymer). At least a part of the inner conductive part 411a may be integrally formed with the first outer conductive part 501, the second outer conductive part 502, the third outer conductive part 503, the fourth outer conductive part 503, and/or the fifth outer conductive part 505, and may include the same material. Alternatively, at least a part of the inner conductive part 411a may be connected with the first outer conductive part 501, the second outer conductive part 502, the third outer conductive part 503, the fourth outer conductive part 503, and/or the fifth outer conductive part 505, and may include other metallic materials. The nonconductive part 411b may be coupled with the inner conductive part 411a, and the first insulation part 5061, the second insulation part 5062, the third insulation part 5063, the fourth insulation part 5064, and/or the fifth insulation part 5065 may be connected with the nonconductive part 411b. The first insulation part 5061, the second insulation part 5062, the third insulation part 5063, the fourth insulation part 5064, and/or the fifth insulation part 5065 may be integrally formed with the nonconductive part 411b, and may include the same material.

The inner conductive part 411a may be coupled with the nonconductive part 411b to be physically separated from the first outer conductive part 501, the second outer conductive part 502, the third outer conductive part 503, the fourth outer conductive part 504 or the fifth outer conductive part 505.

The first support member 411 may be disposed between the display 430 and the PCB 440. The display 430 may be disposed on one surface of the first support member 411, and the PCB 440 may be disposed on the other side surface 4112 of the first support member 411.

The second support member 460 may be coupled with the first support member 411, and may be disposed between the PCB 440 and a rear surface plate (e.g., the rear surface plate 380 of FIG. 3). The second support member 460 may be coupled with the first support member 411 along with the PCB 440 by using a fasteners, e.g., a bolt, and may serve to cover and protect the PCB 440. The second support member 460 includes bolt holes 462 and 463. The PCB 440 includes bolt holes 442. A bolt hole may be a penetrating hole to have a bolt inserted thereinto.

The first support member 411 includes bolt fastening bosses 412 and 413. A boss may be a bundle or a reinforcing structure including a groove or a penetration hole including a crest for fastening a bolt. The bosses 412 and 413 may be formed on the inner conductive part 411a or the nonconductive part 411b. The boss formed on the nonconductive part 411b may be a metallic structure including a nut and coupled with the nonconductive part 411b.

Some bolt holes 463 of the second support member 460 and some bosses 413 of the first support member 411 may be aligned when viewed above the second support member 460. Accordingly, the second support member 460 may be fastened to the first support member 411 by bolts.

Some bolt holes 462 of the second support member 460, some bolt holes 442 of the PCB 440, and some bosses 412 of the first support member 411 may be aligned when viewed above the second support member 460. Accordingly, the second support member 460 and the PCB 440 may be fastened to the first support member 411 altogether by bolts.

Referring again to FIG. 5, the antenna structure 600 includes the side surface member 410 and/or inner conductive parts 601a, 602a, 603a, 604a, 605a, and 606a, which are connected with the side surface member 410 or are integrally formed with the side surface member 410.

At least some of the first outer conductive part 501, the second outer conductive part 502, the third outer conductive part 503, the fourth outer conductive part 504, or the fifth outer conductive part 505 of the side surface member 410 may be utilized as an antenna radiator.

A part of the second outer conductive part 502 forming a part of the third side surface 5013 may operate as a first antenna radiator ①. The first outer conductive part 501 may operate as a second antenna radiator ②. A part of the fifth outer conductive part 505 forming a part of the first side surface 5011 may operate as a third antenna radiator ③. The third outer conductive part 503 may operate as a fourth antenna radiator ④. A part of the fourth outer conductive part 504 forming a part of the second side surface 5012 and a part of the fourth side surface 5014 may operate as a fifth antenna radiator ⑤. A part of the fifth outer conductive part 505 forming a part of the fourth side surface 5014 and a part of the first side surface 5011 may operate as a sixth antenna radiator ⑥.

Other parts of the side surface member 410 may be utilized as antenna radiators. At least one antenna radiator (e.g., the first antenna radiator ①, the second antenna radiator ②, the third antenna radiator ③, the fourth antenna radiator a the fifth antenna radiator ⑤, or the sixth antenna radiator ⑥) may be electrically connected with a wireless communication circuit disposed on the PCB 440, and a ground. For example, at least a part of the ground may be included in the PCB 440 in which the wireless communication circuit is disposed. The wireless communication circuit may transmit or receive radio electromagnetic waves through at least one antenna radiator.

Figure 6:
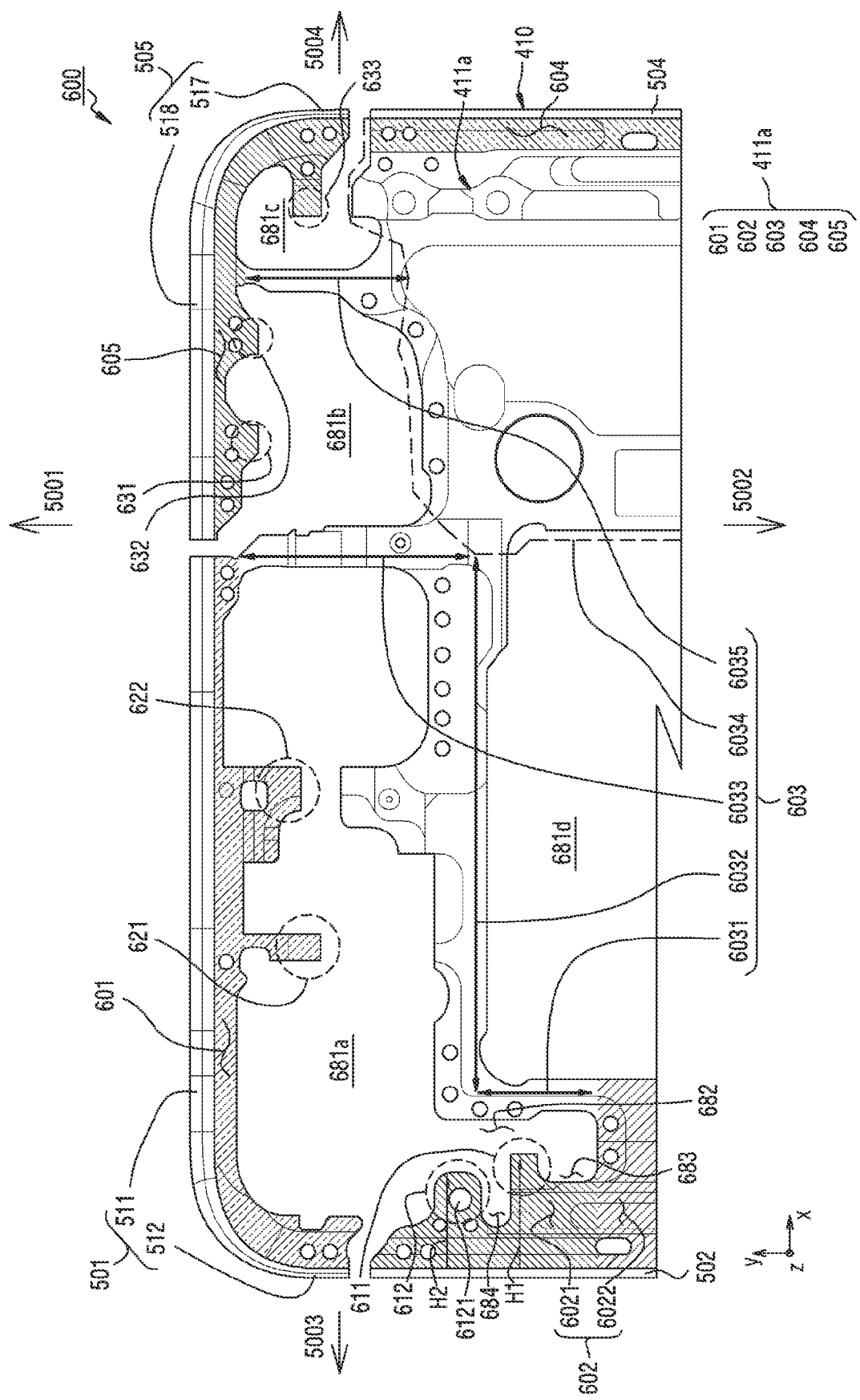
FIG. 6 illustrates an antenna structure according to an embodiment.

FIG. 6 illustrates an antenna structure according to an embodiment.

Referring to FIG. 6, the first inner conductive part 601a, the second inner conductive part 602a, the third inner conductive part 603a, the fourth inner conductive part 604a, the fifth inner conductive part 605a, and/or the sixth inner conductive part 606a may be included in the inner conductive part 411a included in the first support member 411 of FIG. 4. Positions, number or shapes of the first inner conductive part 601a, the second inner conductive part 602a, the third inner conductive part 603a, the fourth inner conductive part 604a, the fifth inner conductive part 605a, or the sixth inner conductive part 606a may vary.

The first antenna radiator ① further includes at least one second inner conductive part 602a, which is connected with the second outer conductive part 502 or is integrally formed with the second outer conductive part 502. The second antenna radiator ② further includes at least one first inner conductive part 601a, which is connected with the first outer conductive part 501 or is integrally formed with the first outer conductive part 501. The third antenna radiator ③ further includes at least one fifth inner conductive part 605a, which is connected with the fifth outer conductive part 505 or is integrally formed with the fifth outer conductive part 505. The fourth antenna radiator ④ further includes at least one third inner conductive part 603a, which is connected with the third outer conductive part 503 or is integrally formed with the third outer conductive part 503. The fifth antenna radiator ⑤ further includes at least one fourth inner conductive part 604a, which is connected with the fourth outer conductive part 504 or is integrally formed with the fourth outer conductive part 504. The sixth antenna radiator ⑥ further includes at least one sixth inner conductive part 606a, which is connected with the fifth outer conductive part 505 or is integrally formed with the fifth outer conductive part 505.

The antenna structure 600 includes the side surface member 410 and the inner conductive part 411a. When viewed above the display 430 of FIG. 4, the inner conductive part 411a includes a first conductive area 601 connected with the first outer conductive part 501 adjacent thereto, a second conductive area 602 connected with the second outer conductive part 502 adjacent thereto, a fourth conductive area 604 connected with the fourth outer conductive part 504 adjacent thereto, and a fifth conductive area 605 connected with the fifth outer conductive part 505 adjacent thereto. When viewed above the display 430, the inner conductive part 411a includes a third conductive area 603 disposed between the first conductive area 601, the second conductive area 602, the fourth conductive area 604, and the fifth conductive area 605. When viewed above the display 430, spaces 681a, 681b, 681c, and 681d may be disposed between the first, second, third, fourth, and fifth conductive areas 601, 602, 603, 604, and 605. The nonconductive part 411b of FIG. 4 may be coupled with the inner conductive part 411a to fill the spaces 681a, 681b, 681c, and 681d at least partially.

The first inner conductive part 601a of FIG. 5 may include at least a part of the first conductive area 601. The second inner conductive part 602a of FIG. 5 may include at least a part of the second conductive area 602. The fourth inner conductive part 604a of FIG. 5 may include at least a part of the fourth conductive area 604. The fifth inner conductive part 605a of FIG. 5 may include at least a part of the fifth conductive area 605.

The third conductive area 603 may connect the first conductive area 601, the second conductive area 602, the fourth conductive area 604, and the fifth conductive area 605. The third conductive area 603 includes a first extended part 6031, a second extended part 6032, a third extended part 6033, a fourth extended part 6034, and a fifth extended part 6035. For example, the first extended part 6031 may be extended from a first tip connected with the second conductive area 602 in the first direction 5001, and may be connected with a second tip of the second extended part 6032. The second extended part 6032 may be extended from the second tip in the fourth direction 5004 and may be connected with a third tip of the third extended part 6033. The third extended part 6033 may be extended from the third tip in the first direction 5001, and may be connected with the first conductive area 601. The fourth extended part 6034 may be extended from an area where the second extended part 6032 and the third extended part 6033 meet each other to be connected with the fourth conductive area 604. The fifth extended part 6035 may be extended from the fourth extended part 6034 in the first direction 5001, and may be connected with the fifth conductive area 605. The third conductive area 603 may be formed in various other shapes.

Referring to FIG. 5, the third conductive area 603 may be connected with the third inner conductive part 603a.

The second conductive area 602 includes a sixth extended part 6021, which is disposed to have a first space 682 with the first extended part 6031 of the third conductive area 603. The second conductive area 602 includes a seventh extended part 6022, which is connected with the sixth extended part 6021 and the first extended part 6031 of the third conductive area 603. The inner conductive part 411a may have the first space 682, which is recessed in the second direction 5002 due to the second conductive area 602 and the first extended part 6031 of the third conductive area 603.

The sixth extended part 6021 of the second conductive area 602 may include a first protrusion 611 or a second protrusion 612, which protrudes in the fourth direction 5004. The first protrusion 611 may protrude, facing the first extended part 6031 of the third conductive area 603, and may be spaced apart from the first extended part 6031. The second protrusion 612 may protrude, facing the first extended part 6031 of the third conductive area 603, and may be spaced apart from the first extended part 6031.

When viewed above the display 430 of FIG. 4, the first protrusion 611 may be spaced apart from the seventh extended part 6022 in the first direction 5001. When viewed above the display 430, the second protrusion 612 may be spaced apart from the first protrusion 611 in the first direction 5001.

The second protrusion 612 may be disposed on various other positions. For example, the second protrusion 612 may be disposed outside the first space 682.

Referring to FIG. 6, a first height H1 by which the first protrusion 611 protrudes from the second outer conductive part 502 in the fourth direction 5004 may be larger than a second height H2 by which the second protrusion 612 protrudes from the second outer conductive part 502 in the fourth direction 5004. Alternatively, the first height H1 may be smaller than the second height H2 or may be substantially the same as the second height H2.

The second conductive area 602 may have a second space 683 which is recessed between the sixth extended part 6021 and the seventh extended part 6022 in the third direction 5003 due to the first protrusion 611. The second conductive area 602 may have a third space 684 which is recessed between the first protrusion 611 and the second protrusion 612 in the third direction 5003 due to the first protrusion 611 and the second protrusion 612.

The third space 684 may be further recessed in the third direction 5003 compared to the second space 683. A depth in the third direction 5003 of the second space 683 or the third space 684 is not limited to the example illustrated in FIG. 6, and may be formed differently. Additionally, the second conductive area 602 omit the second space 683.

The second protrusion 612 includes a bolt fastening boss 6121. The boss 6121 may be a bundle or a reinforcing structure including a groove or a penetrating hole including a crest for fastening a bolt. The boss 6121 may be utilized to fasten the PCB 440 of FIG. 4 and/or the second support member 460 to the first support member 411 with a bolt. The second protrusion 612 may be electrically connected with a ground disposed in the PCB 440 and/or the second support member 460 through the bolt secured to the boss 6121.

The first protrusion 611 may be utilized as a feeding structure that is electrically connected with a wireless communication circuit (e.g., the wireless communication module 192 of FIG. 1) disposed on the PCB 440 of FIG. 4. The wireless communication circuit may transmit a radiation current (or a wireless signal) to the first protrusion 611, and the radiation current may be transmitted to the second outer conductive part 502 through the second conductive area 602 including the first protrusion 611.

Figure 7:
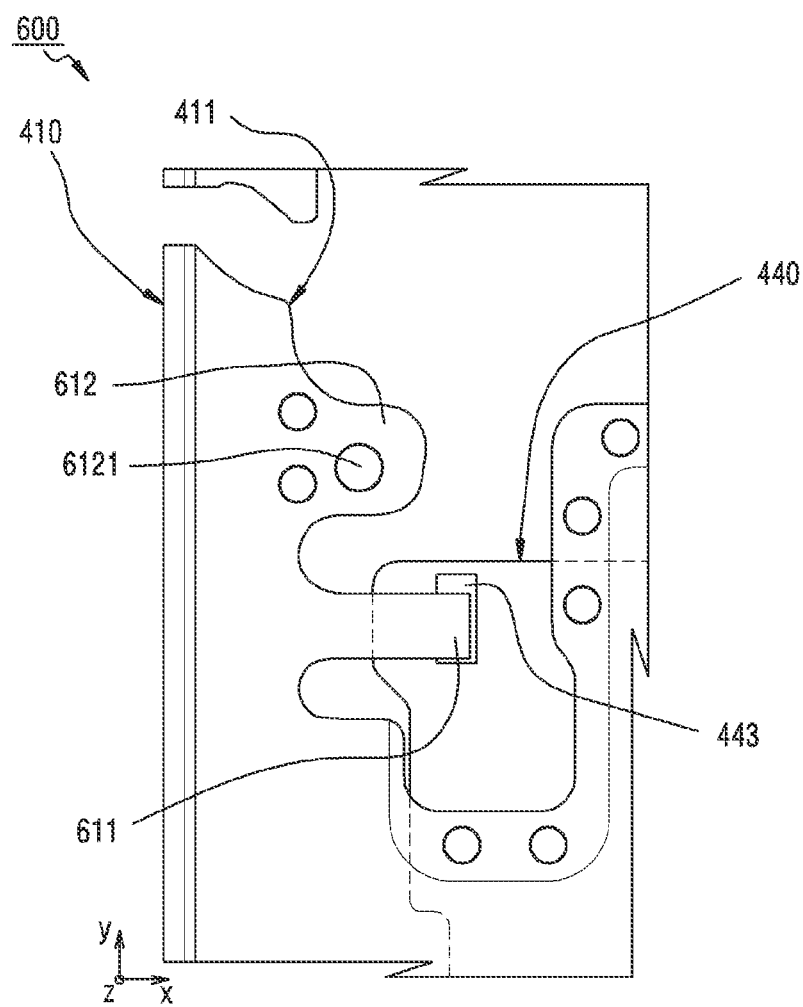
FIG. 7 is a view illustrating an electric connection structure between a printed circuit board (PCB) and an antenna structure according to an embodiment.

FIG. 7 illustrates an electric connection structure between a PCB and an antenna structure according to an embodiment.

Referring to FIGS. 4, 5, and 7, the PCB 440 includes a flexible conductive member 443 disposed on a surface facing the first support member 411. When the PCB 440 is coupled with the first support member 411, the first protrusion 611 may overlap at least the flexible conductive member 443 when viewed above the display 430. The flexible conductive member 443 may electrically connect between the PCB 440 and the first protrusion 611. For example, the flexible conductive member 443 may include a C clip (i.e., a C-shaped spring), a pogo-pin, a spring, a conductive urethane foam, conductive rubber, a conductive tape, a copper connector, etc.

The second conductive area 602 may be electrically connected with a ground included in the PCB 440 at least partially. For example, when viewed above the PCB 440, the PCB 440 may include a flexible conductive member (e.g., a C clip, a pogo-pin, a spring, a conductive urethane foam, conductive rubber, a conductive tape, or a copper connector) disposed on at least one position between the second conductive area 602 (and/or the third conductive area 603) and the PCB 440. The flexible conductive member may electrically connect the ground of the PCB 440 and the second conductive area 602 (or the third conductive area 603). At least a part of the second conductive area 602 may operate as an antenna radiator (e.g., the first antenna radiator ①) along with at least a part of the second outer conductive part 502.

Figure 8A:
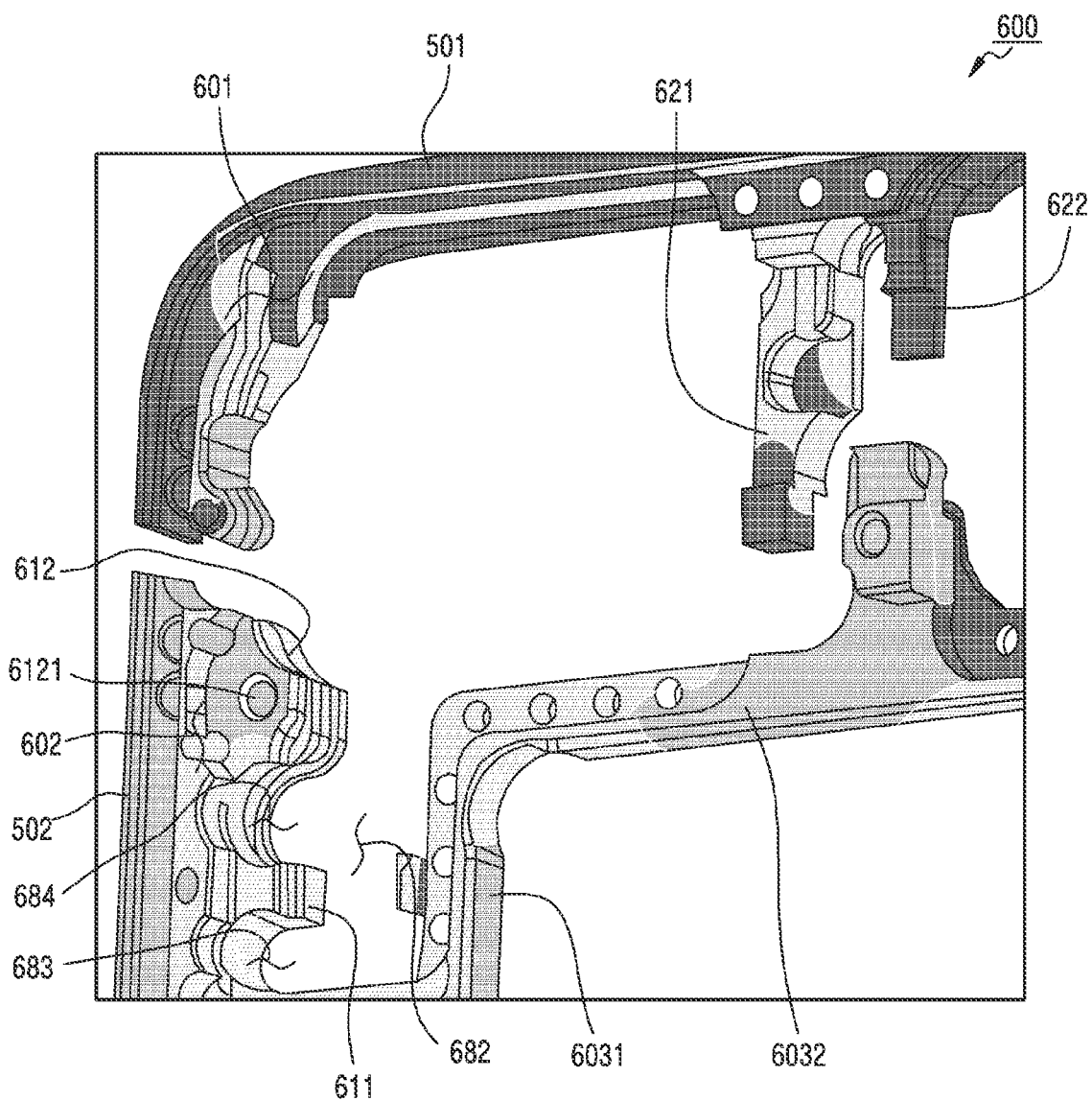
FIG. 8A illustrates current distribution in an antenna structure during feeding, according to an embodiment.
Figure 8B:
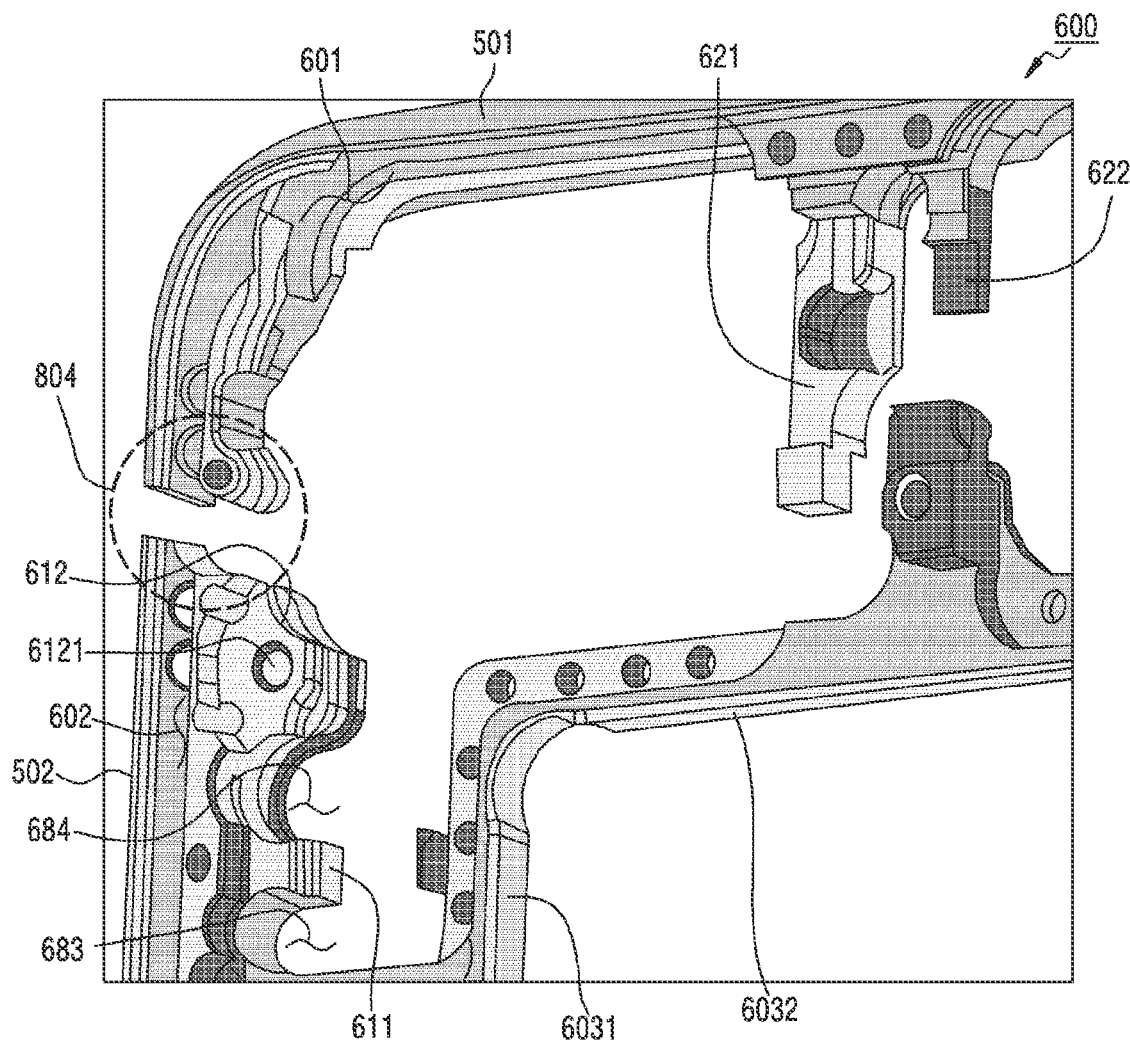
FIG. 8B illustrates electric field distribution in an antenna structure during feeding, according to an embodiment.

FIG. 8A illustrates current distribution in an antenna structure during feeding, according to an embodiment. FIG. 8B illustrates electric field distribution in an antenna structure during feeding, according to an embodiment.

Referring to FIGS. 8A and 8B, when a current is provided through the first protrusion 611, not only at least a part of the second outer conductive part 502, but also at least a part of the second conductive area 602 (e.g., a structure of the inner conductive part 411a forming the first space 682, the second space 683, and the third space 684) may have power distribution that can form an electric field concerning a corresponding frequency band. At least a part of the second conductive area 602 (e.g., the second protrusion 612) may operate as an antenna radiator (e.g., the first antenna radiator ① of FIG. 5) along with at least a part of the second outer conductive part 502. A conductive bolt fastened with the boss 6121 formed on the second protrusion 612 may also operate as an antenna radiator (e.g., the first antenna radiator ①) along with at least a part of the second outer conductive part 502. The structure forming the first space 682, the second space 683, and the third space 684 may be variously changed to enhance antenna radiation performance. At least a part of the second conductive area 602 may adjust radio waves to have a specific frequency.

Referring again to FIG. 6, the first conductive area 601 includes a third protrusion 621 and a fourth protrusion 622 to be electrically connected with the PCB 440. For example, the fourth protrusion 622 may be positioned closer to the third extended part 6033 of the third conductive area 603, compared to the third protrusion 621.

The third protrusion 621 or the fourth protrusion 622 may be electrically connected with the PCB 440 in substantially similar or the same method to or as an electric connection structure between the first protrusion 611 and the PCB 440, suggested in FIG. 7. The third protrusion 621 may be electrically connected with the wireless communication circuit disposed on the PCB 440, and may be utilized as a feeding structure to transmit a current or a signal to an antenna radiator. The fourth protrusion 622 may be electrically connected with the ground disposed on the PCB 440, and may be utilized as a ground for an antenna radiator. At least a part of the first conductive area 601 may operate as an antenna radiator (e.g., the second antenna radiator ②of FIG. 5) along with at least a part of the first outer conductive part 501.

The fifth conductive area 605 includes a fifth protrusion 631 and a sixth protrusion 632 to be electrically connected with the PCB 440. The fifth protrusion 631 may be positioned closer to the third extended part 6033 of the third conductive area 603, compared to the sixth protrusion 632. The fifth protrusion 631 or the sixth protrusion 632 may be electrically connected with the PCB 440 in substantially similar or the same method to or as the electric connection structure between the first protrusion 611 and the PCB 440, as suggested in FIG. 7. The fifth protrusion 631 may be electrically connected with the wireless communication circuit disposed on the PCB 440, and may be utilized as a feeding structure to transmit a current or a signal to an antenna radiator. The sixth protrusion 632 may be electrically connected with the ground disposed on the PCB 440, and may be utilized as a ground for an antenna radiator. At least a part of the fifth conductive area 605 may operate as an antenna radiator (e.g., the third antenna radiator ③ of FIG. 5) along with at least a part of the fifth outer conductive part 505.

The fifth conductive area 605 also includes a seventh protrusion 633 to be electrically connected with the PCB 440. The seventh protrusion 633 may be electrically connected with the wireless communication circuit disposed on the PCB 440, and may be utilized as a feeding structure to transmit a current or a signal to an antenna radiator. The fifth extended part 6035 may be electrically connected with the ground disposed on the PCB 440, and may be utilized as a ground for an antenna radiator. At least a part of the fifth conductive area 605 may operate as an antenna radiator (e.g., the sixth antenna radiator ⑥ of FIG. 5) along with at least a part of the fifth outer conductive part 505.

Referring again to FIGS. 8A and 8B, a first antenna radiator including a least a part of the second outer conductive part 502 and at least a part of the second conductive area 602 may be electromagnetically coupled with a second antenna radiator (e.g., the second antenna radiator ② of FIG. 5) including at least a part of the first outer conductive part 501 and at least a part of the first conductive area 601, thereby forming a resonant frequency in a corresponding frequency band. In a segment part 804 between the first outer conductive part 501 and the second outer conductive part 502, a second electric field formed by the second antenna radiator may be electromagnetically coupled with a first electric field formed by the first antenna radiator. The second electric field may have a component such as inductance, capacitance, or conductance act on the first electric field, and this phenomenon may be referred to as a loading effect concerning an electric element component.

Figure 9:
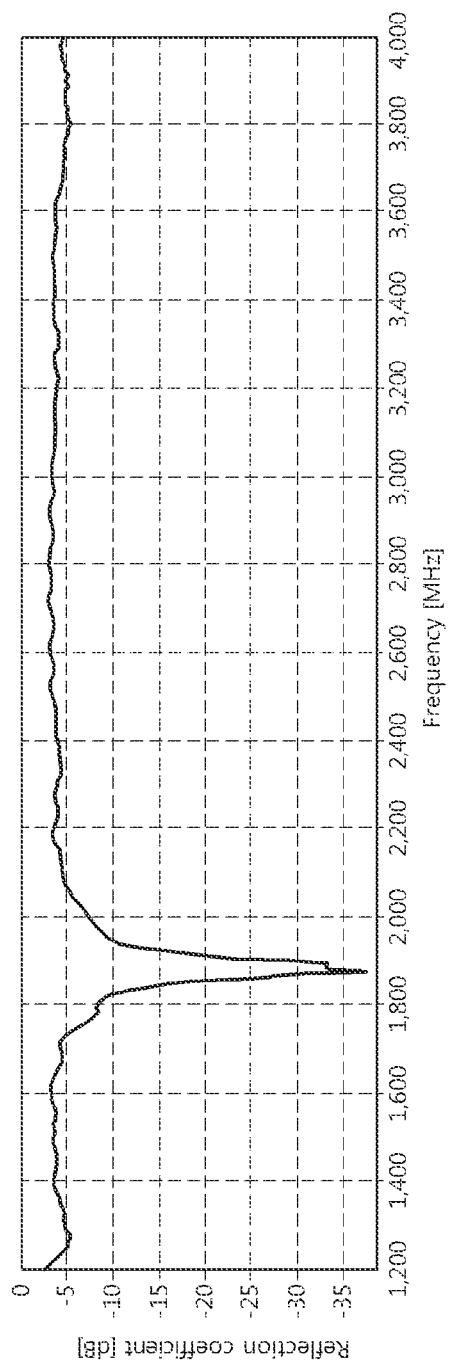
FIG. 9 is a graph illustrating reflection coefficients on frequency distribution concerning an antenna radiator according to an embodiment.

FIG. 9 is a graph illustrating reflection coefficients on frequency distribution concerning an antenna radiator according to an embodiment.

Referring to FIG. 9, the first antenna radiator and the second antenna radiator may be electromagnetically coupled with each other, thereby forming a resonant frequency between about 1800 and 2000 MHz.

Referring again to FIG. 5, the antenna structure 600 may further include a frequency adjustment circuit connected to a transmission line between at least one antenna radiator (e.g., the first antenna radiator ①, the second antenna radiator ②, the third antenna radiator ③, the fourth antenna radiator ④, the fifth antenna radiator ⑤, and/or the sixth antenna radiator ⑥), and the wireless communication circuit. The transmission line transmits a signal (voltage, current) of a radio frequency (RF) through an antenna radiator, and may be defined as a conducting system that transmits waves by an electric element (e.g., an element having a resistance per unit length, inductance, conductance, or capacitance). The transmission line may include a wire or an electric path of various shapes for connecting the wireless communication circuit and the antenna radiator. The frequency adjustment circuit may include an electric element having a component such as inductance, capacitance, or conductance, which acts on the transmission line. The frequency adjustment circuit may include various elements such as a lumped element or a passive element. The frequency adjustment circuit (e.g., a matching circuit) may adjust impedance of the transmission line or impedance of the antenna radiator, and accordingly, the impedance of the transmission line and the impedance of the antenna radiator may match each other (e.g., impedance matching). The impedance matching may induce an efficient signal flow in a specific frequency. The impedance of the antenna radiator may be related to transmission of power from a transmitter to an antenna radiator, or transmission of power from an antenna radiator to a receiver. When the impedance of the antenna radiator and the impedance of the transmission line match each other, reflection on a connection part between the transmission line and the antenna radiator may be minimized, so that maximum power transmission (or power loss minimization) or efficient signal transmission is possible through the antenna radiator.

The frequency adjustment circuit may shift a resonant frequency of at least one antenna radiator (e.g., the first antenna radiator ①, the second antenna radiator ②, the third antenna radiator ③, the fourth antenna radiator ④, the fifth antenna radiator ⑤, and/or the sixth antenna radiator ⑥) to a designated frequency, or may shift the resonant frequency as much as designated.

Referring again to FIGS. 6, 8A, and 8B, the frequency adjustment circuit may reduce an electromagnetic influence between the first antenna radiator (e.g., the first antenna radiator ① of FIG. 5), which includes at least a part of the second outer conductive part 502 and at least a part of the second conductive area 602, and the second antenna radiator (e.g., the second antenna radiator ② of FIG. 5), which includes at least a part of the first outer conductive part 501 and at least a part of the first conductive area 601. The frequency adjustment circuit can prevent degradation of antenna radiation performance concerning the first antenna radiator or the second antenna radiator in a selected or designated frequency band, by reducing the electromagnetic influence between the first antenna radiator and the second antenna radiator.

Referring again to FIG. 4, the electronic device 400 may further include a conductive pattern disposed on the second support member 460. For example, the conductive pattern may be implemented in various shapes to be disposed on the first support member 460. The conductive pattern may be implemented in various methods such as plating, printing, stainless steel (sus), or FPCB. The conductive pattern disposed on the second support member 460 may be implemented by laser direct structuring (LDS). LDS may refer to a method that forms a conductive pattern by designing a pattern on the second support member 460 (e.g., a structure formed with resin such as polycarbonate) by using lasers, and plating over the pattern with a conductive material such as copper or nickel. The PCB 440 may include a flexible conductive member 472 (e.g., a C clip, a pogo pin, a spring, a conductive urethane foam, conductive rubber, a conductive tape, or a copper connector) disposed on a surface facing the second support member 460. The conductive pattern disposed on the second support member 460 may be electrically connected with the wireless communication circuit through the flexible conductive member 472, and may be utilized as an antenna radiator. The conductive pattern disposed on the second support member 460 may form a resonant frequency in at least one designated frequency band related to at least one antenna radiator (e.g., the first antenna radiator ①, the second antenna radiator ②, the third antenna radiator ③, the fourth antenna radiator ④, the fifth antenna radiator ⑤, and/or the sixth antenna radiator ⑥ of FIG. 5) of an antenna structure (e.g., the antenna structure 600 of FIG. 6).

Figure 10:
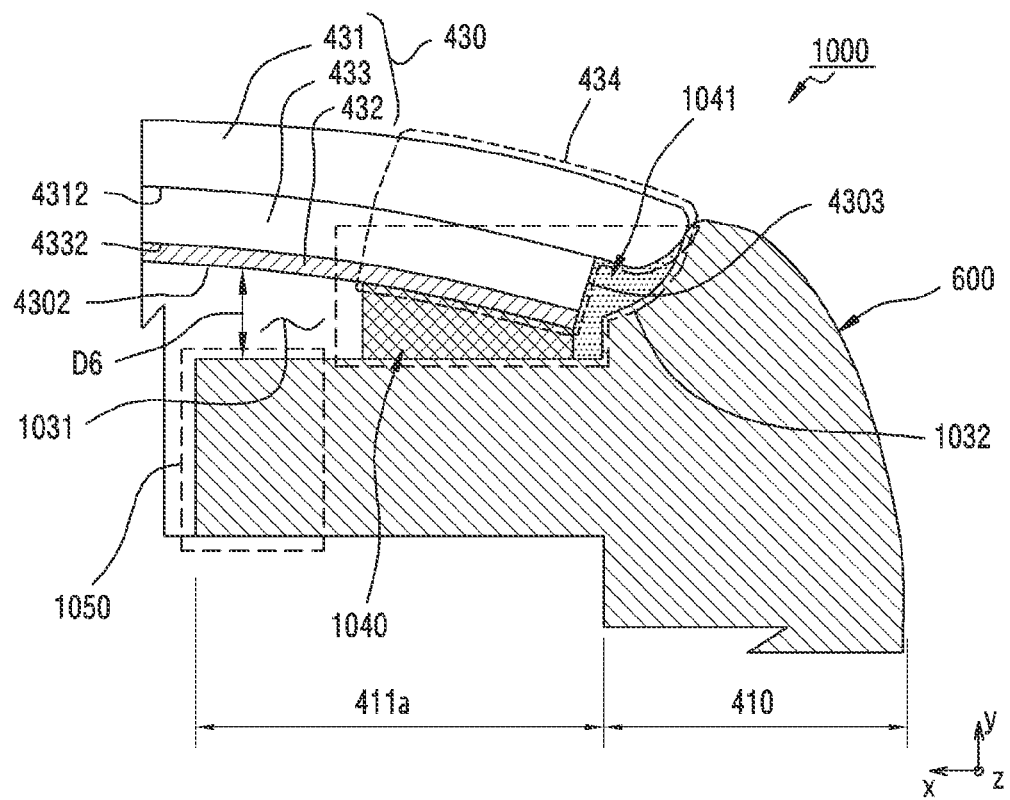
FIG. 10 illustrates an antenna device implemented by an antenna structure and a display in an electronic device according to an embodiment.

FIG. 10 illustrates an antenna device implemented by an antenna structure and a display in an electronic device according to an embodiment.

Referring to FIG. 10, an antenna device 1000 includes a display 430 and an antenna structure 600. The display 430 includes a window 431, a panel 433, which implements pixels by including a light emitting element such as organic LEDs (OLEDs), and a ground layer 432. The panel 433 may be disposed on a rear surface 4312 of the window 431, and the ground layer 432 may be disposed along a rear surface 4332 of the panel 433 at least partially. The ground layer 432 may be a conductive layer of various shapes. The ground layer 432 may serve to block electromagnetic interference (EMI). The ground layer 432 may be included in the panel 433.

The display 430 may be disposed on one surface of the antenna structure 600. The antenna structure 600 may include a side surface member 410 and an inner conductive part 411*a* (e.g., the first conductive area 601, the second conductive area 602, the third conductive area 603, the fourth conductive area 604, or the fifth conductive area 605 of FIG. 6), which is connected with the side surface member 410 or is integrally formed with the side surface member 410.

The antenna structure 600 includes a recess 1031, which is formed by the side surface member 410 and the inner conductive part 411*a*, and the display 430 may be disposed in the recess 1031. An edge part 434 of the display 430 may be coupled with the antenna structure 600 in an edge space 1032 of the recess 1031 through bonding members 1040 and 1041. The first bonding member 1040 may be disposed between a rear surface 4302 of the display 430 and the antenna structure 600. The first bonding member 1040 may be double-sided tape or various other adhesive materials. The first bonding member 1040 may include a material that is electrically insulated as a nonconductive member. For example, the second bonding member 1041 may be disposed between a side surface 4303 of the display 430 and the antenna structure 600. The second bonding member 1041 may include various adhesive materials such as a polymer. The first bonding member 1040 and the second bonding member 1041 may also be integrally formed with each other and may include the same material. Alternatively, one of the first bonding member 1040 and the second bonding member 1041 may be omitted. The first bonding member 1040 or the second bonding member 1041 can prevent foreign substances such as water, dust from flowing into the electronic device 400 through a gap between the display 430 and the antenna structure 600.

At least a part of the inner conductive part 411*a* may be spaced apart from the ground layer 432 of the display 430. For example, the ground layer 432 of the display 430 may be physically separated from the inner conductive part 411*a* by the first bonding member 1040 or the second bonding member 1041, which is disposed between the antenna structure 600 and the display 430.

At least a part 1050 of the inner conductive part 411*a* may operate as a feeding structure which is electrically connected with a wireless communication circuit. When the PCB 440 of FIG. 4 is coupled with the antenna structure 600, at least the part 1050 of the inner conductive part 411*a* may physically come into contact with a flexible conductive member disposed on the PCB 440, and may be electrically connected with the wireless communication circuit disposed on the PCB 440. The wireless communication circuit may transmit or receive a wireless signal through at least the part 1050 of the inner conductive part 411*a*. For example, the wireless communication circuit may provide a radiation current (or a wireless signal) to at least the part 1050 of the inner conductive part 411*a*, and the radiation current may be transmitted to at least a part of the side surface member 410 (e.g., the first outer conductive part 501, the second outer conductive part 502, the third outer conductive part 503, the fourth outer conductive part 504, or the fifth outer conductive part 505 of FIG. 5) through the inner conductive part 411*a*.

At least the part 1050 of the inner conductive part 411*a*, which is utilized as a feeding structure, may overlap the ground layer 432 of the display 430 at least partially when viewed above the display 430. At least the part 1050 of the inner conductive part 411*a* may be spaced apart from the ground layer 432 of the display 430. A gap D6 between at least the part 1050 of the inner conductive part 411*a* and the ground layer 432 of the display 430 may be about 0.8-1.0 mm.

A structure in which at least the part 1050 of the inner conductive part 411*a*, which is utilized as a feeding structure, is physically separated from the ground layer 432 of the display 430, and overlaps the ground layer 432 of the display 430 at least partially when viewed above the display 430, may adjust a resonant frequency concerning at least one antenna radiator which receives a current from the feeding structure and radiates the current. At least one antenna radiator may include at least one of the first antenna radiator ①, the second antenna radiator ②, the third antenna radiator ③, the fourth antenna radiator ④, or the fifth antenna radiator ⑤ of FIG. 5.

Figure 11:
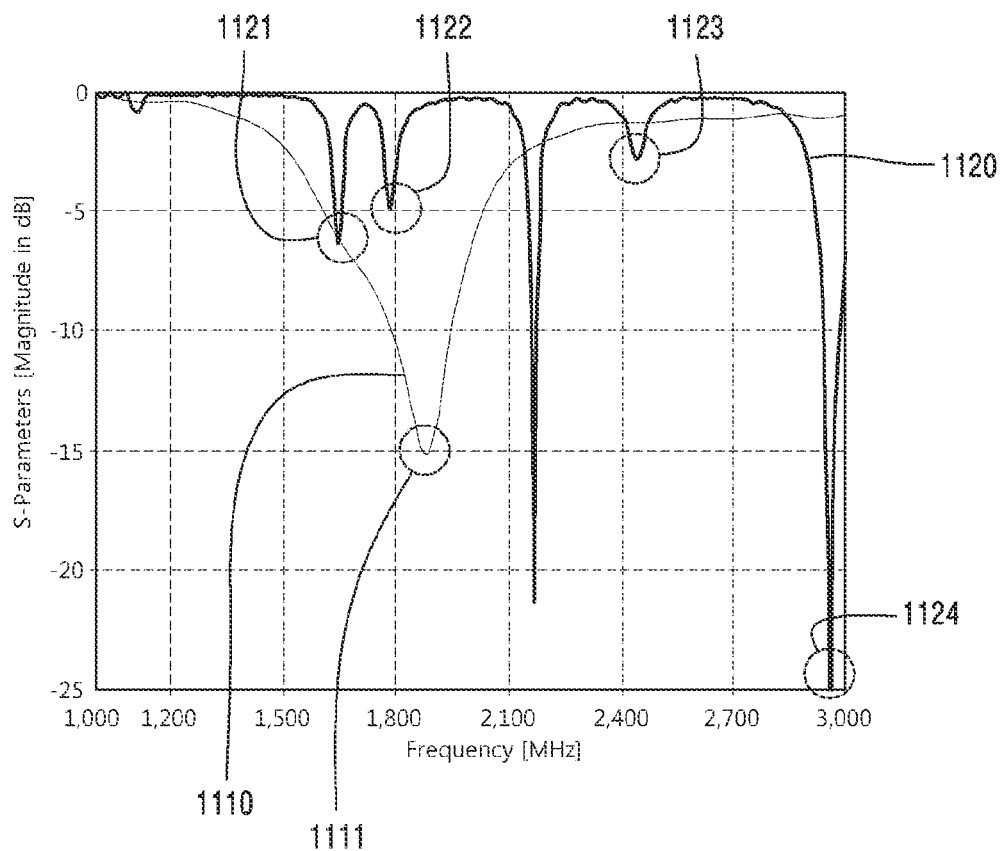
FIG. 11 is a graph illustrating a ratio of an output voltage to an input voltage in frequency distribution concerning the antenna device of FIG. 10, according to an embodiment.

FIG. 11 is a graph illustrating a ratio of an output voltage to an input voltage on frequency distribution concerning the antenna device of FIG. 10, according to an embodiment.

Referring to FIG. 11, reference numeral 1120 indicates an S parameter concerning the antenna device 1000, and reference numeral 1110 indicates an S parameter in a state where the display 430 is excluded from the antenna device 1000. Referring to reference numeral 1110, substantially one resonant frequency 1111 may be formed in the state the display 430 is excluded from the antenna device 1000. Referring to reference numeral 1120, the antenna device 1000 may form a plurality of resonant frequencies 1121, 1122, 1123, and 1124.

Referring to reference numerals 1110 and 1120, the structure in which at least the part 1050 of the inner conductive part 411*a*, which is utilized as a feeding structure, is physically separated from the ground layer 432 of the display 430, and overlaps the ground layer 432 of the display 430 at least partially when viewed above the display 430, may expand a bandwidth. The ground layer 432 of the display 430 may be electromagnetically coupled with at least the part 1050 of the inner conductive part 411*a*, which is utilized as a feeding structure, thereby expanding a bandwidth. For example, the antenna device 1000 may transmit or receive signals of different frequencies in a selected or designated frequency band.

Referring again to FIG. 10, the edge part 434 of the display 430 may be bent toward a rear surface plate. Alternatively, the display 430 may be formed to be substantially flat.

Figure 12:
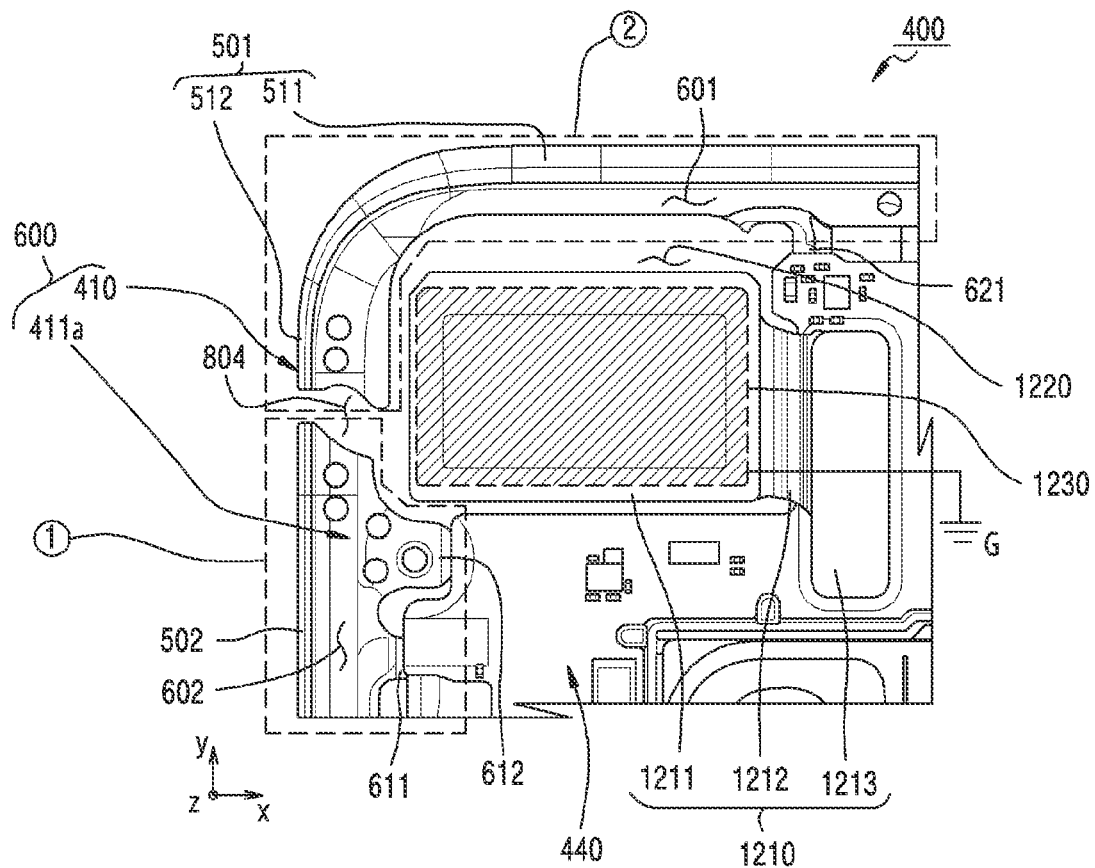
FIG. 12 illustrates an electronic device according to an embodiment.

FIG. 12 illustrates an electronic device according to an embodiment.

Referring to FIG. 12, the electronic device 400 includes an antenna structure 600, a PCB 440, and a ground member 1230.

The antenna structure 600 includes a side surface member 410 and an inner conductive part 411*a*. The side surface member 410 includes a first outer conductive part 501 and a second outer conductive part 502. The inner conductive part 411*a* includes a first conductive area 601, which is connected with the first outer conductive part 501 adjacent thereto, and a second conductive area 602, which is connected with the second outer conductive part 502 adjacent thereto.

At least a part of the second outer conductive part 502 and at least a part of the second conductive area 602 may operate as a first antenna radiator ①. A least a part included in the second conductive area 602 may be electrically connected with a wireless communication circuit disposed on the PCB 440, and may serve as a feeding structure for the first antenna radiator ①.

At least a part of the first outer conductive part 501 and at least a part of the first conductive area 601 may operate as a second antenna radiator ②. A least a part (e.g., the third protrusion 621) included in the first conductive area 601 may be electrically connected with the wireless communication circuit disposed on the PCB 440, and may serve as a feeding structure for the second antenna radiator ②.

An area (or a space) 1220 that does not overlap the antenna structure 600 and the PCB 440 may be disposed when viewed above the display 430 of FIG. 4. For example, referring to FIGS. 5 and 12, when viewed above the display 430, the area 1220 may be disposed in the proximity of a first corer from among the first corner to which a first part 511 and a second part 512 of the first outer conductive part 501 are connected, a second corner to which a third part 513 and a fourth part 514 of the second outer conductive part 502 are connected, a third corner to which a fifth part 515 and a sixth part 516 of a fourth outer conductive part 504 are connected, and a fourth corner to which a seventh part 517 and an eighth part 518 of a fifth conductive part 505 are connected. The area 1220 may be rectangular when viewed above the display 430, but is not limited thereto and may have various other shapes.

When viewed above the display 430 of FIG. 4, a ground member 1230 may be disposed to overlap the area 1220 at least partially, and may be electrically connected with a ground G of the PCB 440. When viewed above the display 430, the ground member 1230 may not overlap the antenna structure 600 and the PCB 440. The ground member 1230 may shift a resonant frequency concerning the first antenna radiator ① and/or the second antenna radiator ②.

Figure 13:
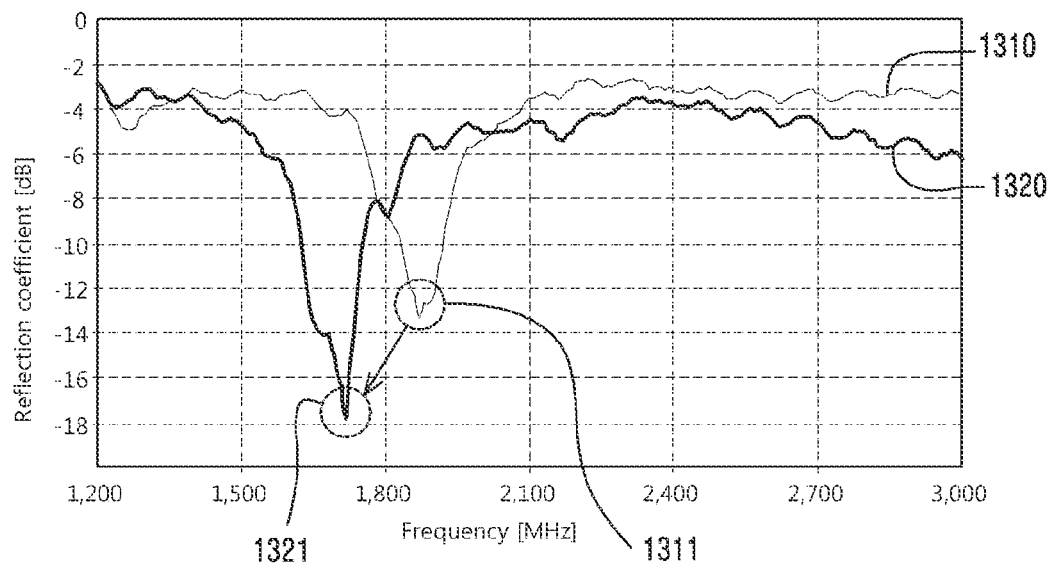
FIG. 13 is a graph illustrating reflection coefficients in frequency distribution concerning the electronic device of FIG. 12, according to an embodiment.

FIG. 13 is a graph illustrating reflection coefficients on frequency distribution concerning the electronic device of FIG. 12, according to an embodiment.

Referring to FIG. 13, reference numeral 1310 indicates reflection coefficients on frequency distribution concerning a state where the ground member 1230 is excluded from the antenna device including the first antenna radiator ① and the second antenna radiator ②. Reference numeral 1320 indicates reflection coefficients on frequency distribution concerning the antenna device including the first antenna radiator ① and the second antenna radiator ②. Referring to reference numeral 1310, the first antenna radiator ① and the second antenna radiator ② may be electromagnetically coupled with each other, thereby forming a first resonant frequency 1311 in about 1800-2000 MHz. In a segment part 804 between the first antenna radiator ① and the second antenna radiator ②, a second electric field formed by the second antenna radiator ② may be electromagnetically coupled with a first electric field formed by the first antenna radiator ①. Referring to reference numeral 1320, the resonant frequency of the antenna device may be shifted from the first resonant frequency 1311 to a second resonant frequency 1321 between about 1600 and 1800 MHz due to the ground member 1230.

Referring again to FIG. 12, the ground member 1230 may be included in at least one component electrically connected with the PCB 440. The at least one component may be a camera device 1210. The camera device 1210 includes a camera module 1211, an FPCB 1212, and a connector 1213. At least a part of the camera module 1211 may include the ground member 1230, and may be disposed on the area 120. The ground member 1230 may be disposed on a PCB included in the camera module 1211. The FPCB 1212 may electrically connect the camera module 1211 and the PCB 440. The ground member 1230 included in the camera module 1211 may be electrically connected with a ground G of the PCB 440 through a wire included in the FPCB 1212. The connector 1213 may be disposed at an end of the FPCB 1212 to be connected with a connector disposed on the PCB 440. The ground member 1330 may also be formed by various other electronic components.

Figure 14:
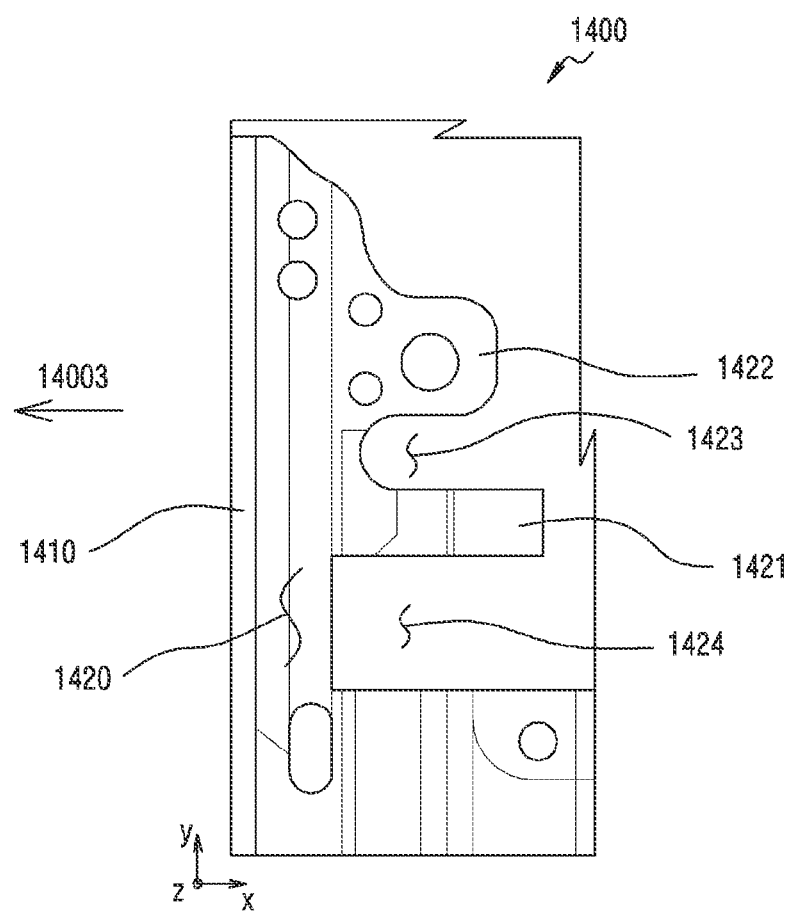
FIG. 14 illustrates an antenna structure according to an embodiment.

FIG. 14 illustrates an antenna structure according to an embodiment.

Referring to FIG. 14, an antenna structure 1400 includes a second outer conductive part 1410 and a second conductive area 1420. The second conductive area 1420 includes a first protrusion 1421 and a second protrusion 1422. The second conductive area 1420 includes a third space 1423 and a second space 1424, which are disposed with the first protrusion 1421 formed therebetween. The second space 1424 illustrated in FIG. 14 may be further recessed in a third direction 14003, compared to the second space 683 of the antenna structure 600 illustrated in FIG. 6.

Figure 15:
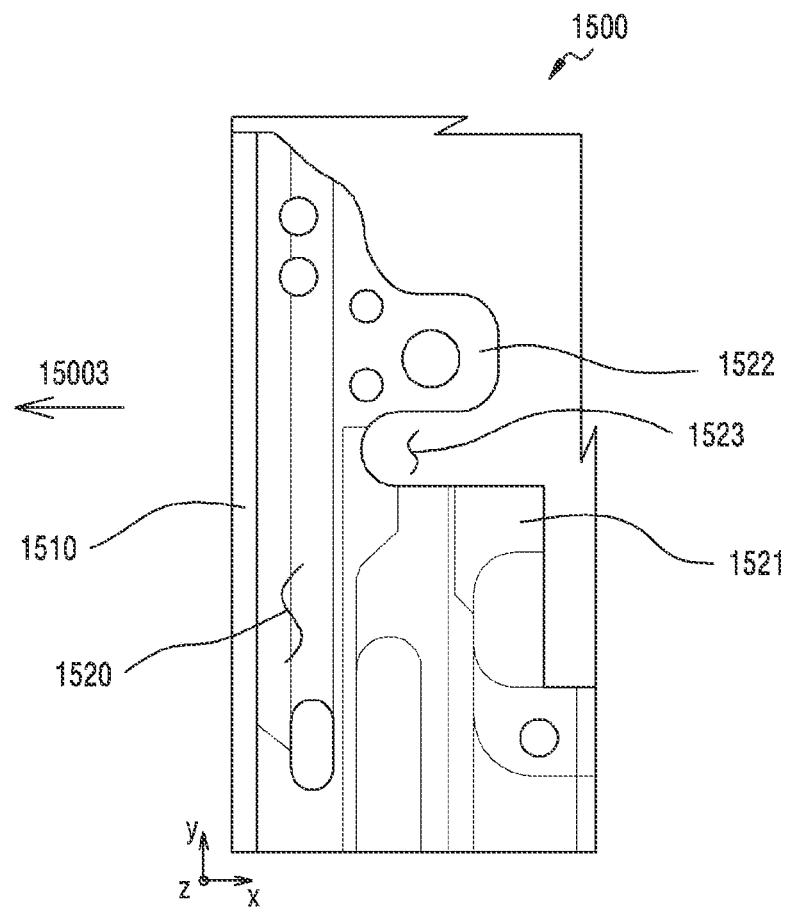
FIG. 15 illustrates an antenna structure according to an embodiment.

FIG. 15 illustrates an antenna structure according to an embodiment.

Referring to FIG. 15, an antenna structure 1500 includes a second outer conductive part 1510 and a second conductive area 1520. The second conductive area 1520 includes a first protrusion 1521 and a second protrusion 1522. The second conductive area 1520 includes a third space 1523, which is recessed in a third direction 15003 between the first protrusion 1521 and the second protrusion 1522. The antenna structure 1500 of FIG. 15 omits the second space 683 of the antenna structure 600 shown in FIG. 6 or the second space 1424 of the antenna structure 1400 shown in FIG. 14.

Figure 16:
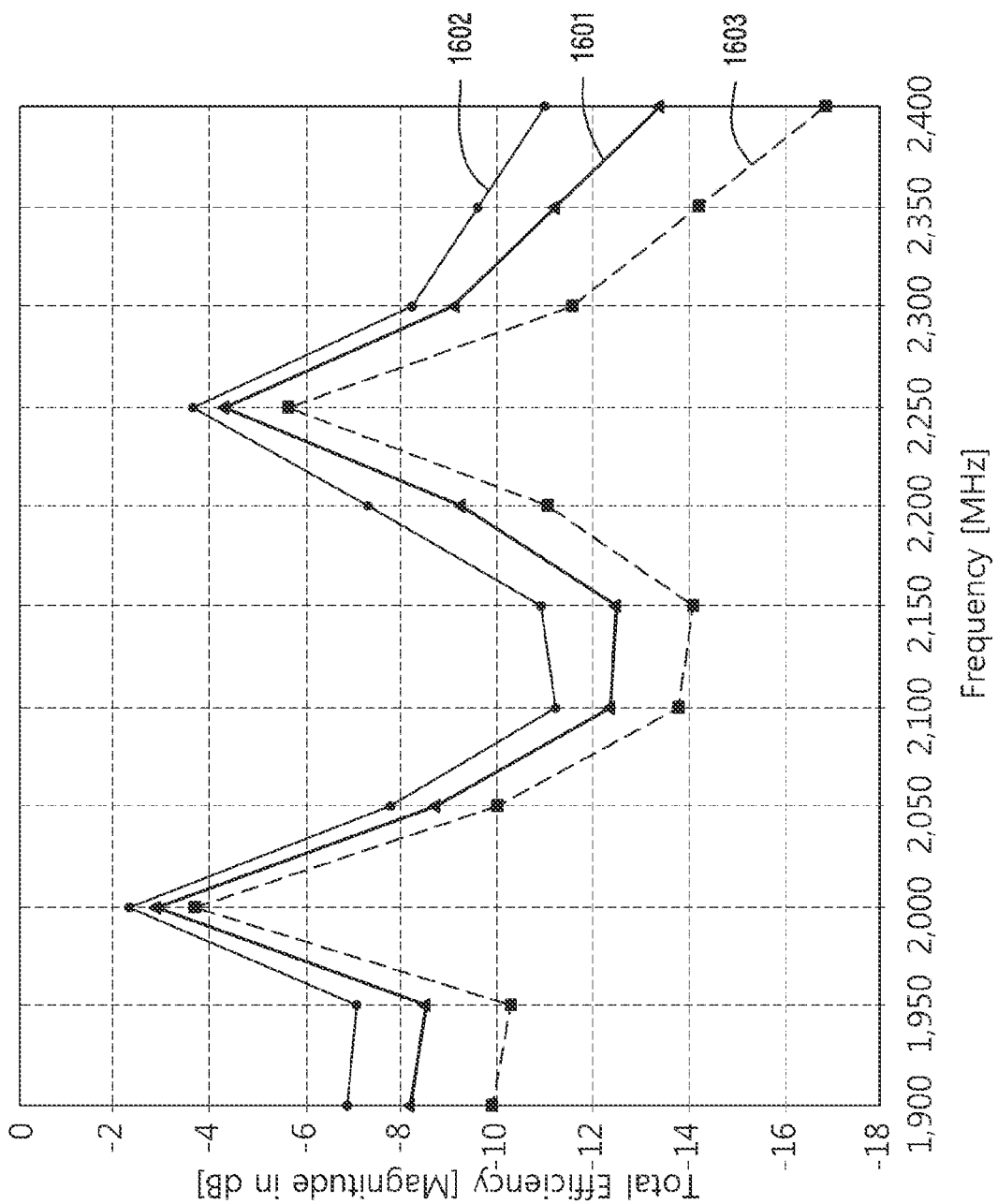
FIG. 16 is a graph illustrating antenna radiation performance on frequency distribution according to a shape of an antenna structure, according to an embodiment.

FIG. 16 is a graph illustrating antenna radiation performance on frequency distribution according to a shape of an antenna structure according to an embodiment.

Referring to FIG. 16, reference numeral 1601 indicates antenna radiation performance concerning an antenna device implemented by the antenna structure 600 of FIG. 6, reference numeral 1602 indicates antenna radiation performance concerning an antenna device implemented by the antenna structure 1400 of FIG. 14, and reference numeral 1603 indicates antenna radiation performance concerning an antenna device implemented by the antenna structure 1500 of FIG. 15. Referring to reference numerals 1601, 1602, and 1603, antenna radiation performance varies according to a shape of a second space (e.g., the second space 683 of FIG. 6 or the second space 1424 of FIG. 14) or the presence/absence of the second space.

Figure 17A:
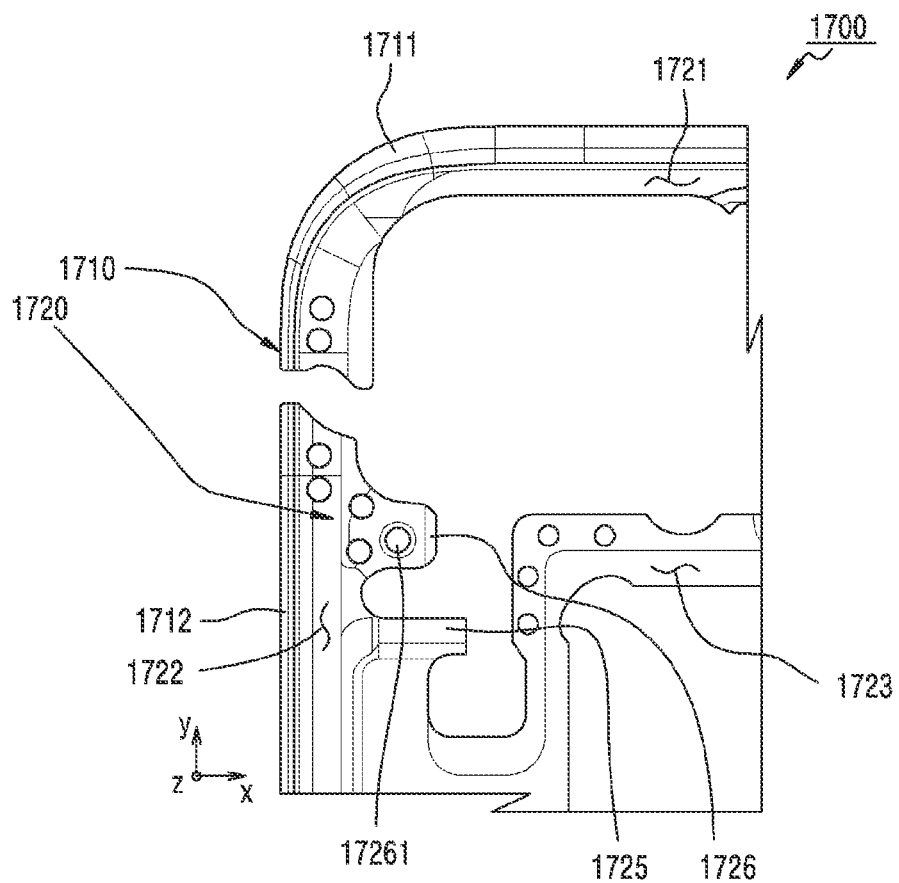
FIG. 17A illustrates an antenna structure according to an embodiment.

FIG. 17A illustrates an antenna structure according to an embodiment.

Referring to FIG. 17A, an antenna structure 1700 includes a side surface member 1710 and an inner conductive part 1720. The side surface member 1710 includes a first outer conductive part 1711 and a second outer conductive part 1712. The inner conductive part 1720 includes a first conductive area 1721 connected with the first outer conductive part 1711 adjacent thereto, a second conductive area 1722 connected with the second outer conductive part 1712 adjacent thereto, and a third conductive area 1723 connected with the first conductive area 1721 adjacent thereto.

At least a part of the second outer conductive part 1712 and at least a part of the second conductive area 1722 may operate as a first antenna radiator (e.g., the first antenna radiator ① of FIG. 5). At least a part of the first outer conductive part 1711 and at least a part of the first conductive area 1721 may operate as a second antenna radiator (e.g., the second antenna radiator ② of FIG. 5).

A first protrusion 1725 included in the second conductive area 1722 may be electrically connected with a wireless communication circuit disposed on a PCB, and may serve as a feeding structure for the first antenna radiator. The first antenna radiator includes a second protrusion 1726 included in the second conductive area 1722. The second protrusion 1726 includes a bolt fastening boss 17261.

Figure 17B:
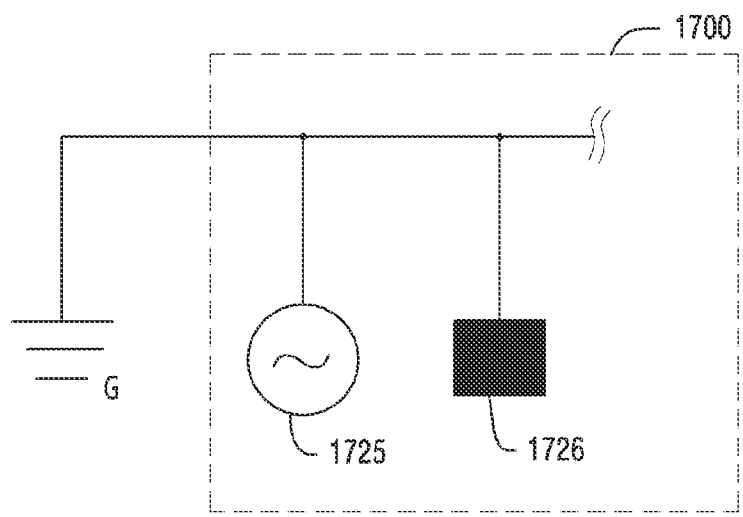
FIG. 17B illustrates an equivalent circuit concerning the antenna structure of FIG. 17A, according to an embodiment.

FIG. 17B illustrates an equivalent circuit concerning the antenna structure of FIG. 17A, according to an embodiment.

Referring to FIG. 17B, when the PCB and the antenna structure 1700 are coupled with each other, the first protrusion 1725 utilized as the feeding structure may be electrically connected between the second protrusion 1726 and a ground G of the PCB.

Figure 18A:
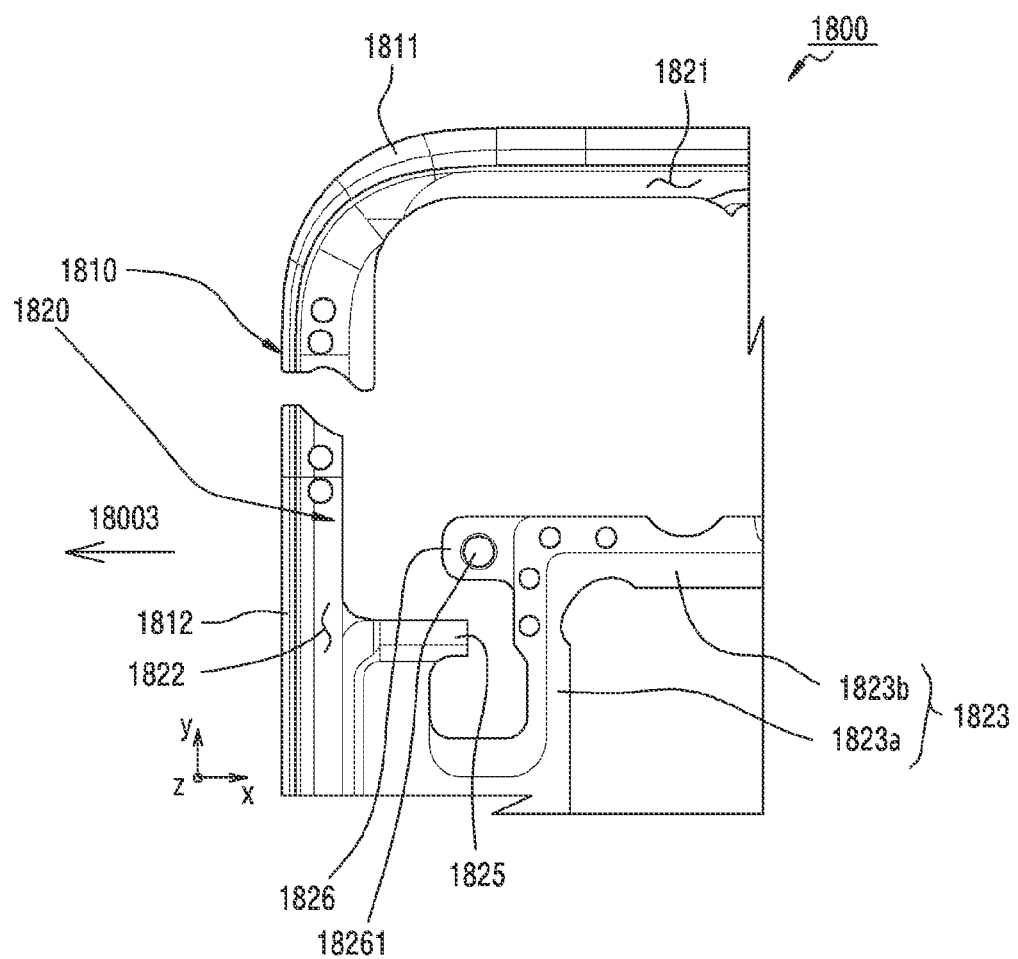
FIG. 18A illustrates an antenna structure according to an embodiment.

FIG. 18A illustrates an antenna structure according to an embodiment.

Referring to FIG. 18A, an antenna structure 1800 includes a side surface member 1810 and an inner conductive part 1820. The side surface member 1810 includes a first outer conductive part 1811 and a second outer conductive part 1812. The inner conductive part 1820 includes a first conductive area 1821, which is connected with the first outer conductive part 1811 adjacent thereto, a second conductive area 1822, which is connected with the second outer conductive part 1812 adjacent thereto, and a third conductive area 1823, which is connected with the first conductive area 1821.

At least a part of the second outer conductive part 1812 and at least a part of the second conductive area 1822 may operate as a first antenna radiator (e.g., the first antenna radiator ① of FIG. 5). At least a part of the first outer conductive part 1811 and at least a part of the first conductive area 1821 may operate as a second antenna radiator (e.g., the second antenna radiator ② of FIG. 5).

A first protrusion 1825 included in the second conductive area 1822 may be electrically connected with a wireless communication circuit disposed on a PCB, and may serve as a feeding structure for the first antenna radiator.

The antenna structure 1800 also includes a second protrusion 1826 extended from the third conductive area 1823 and having a bolt fastening boss 18261, which is different from the second protrusion 1726 of the antenna structure 1700 illustrated in FIG. 17A. For example, the second protrusion 1826 may be extended from a first extended part 1823a of the third conductive area 1823 in a third direction 18003. The second protrusion 1826 may be extended from an area where the first extended part 1823a of the third conductive area 1823 and a second extended part 1823b meet each other in the third direction 18003.

Figure 18B:
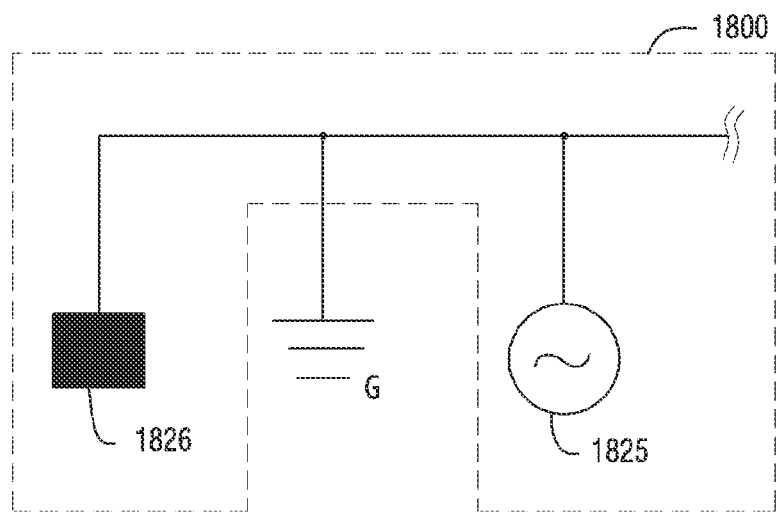
FIG. 18B illustrates an equivalent circuit concerning the antenna structure of FIG. 18A, according to an embodiment.

FIG. 18B illustrates an equivalent circuit concerning the antenna structure of FIG. 18A, according to an embodiment.

Referring to FIG. 18B, when the PCB and the antenna structure 1800 are coupled with each other, a ground G of the PCB may be electrically connected between the second protrusion 1826 and the first protrusion 1825 which is utilized as a feeding structure.

Figure 19A:
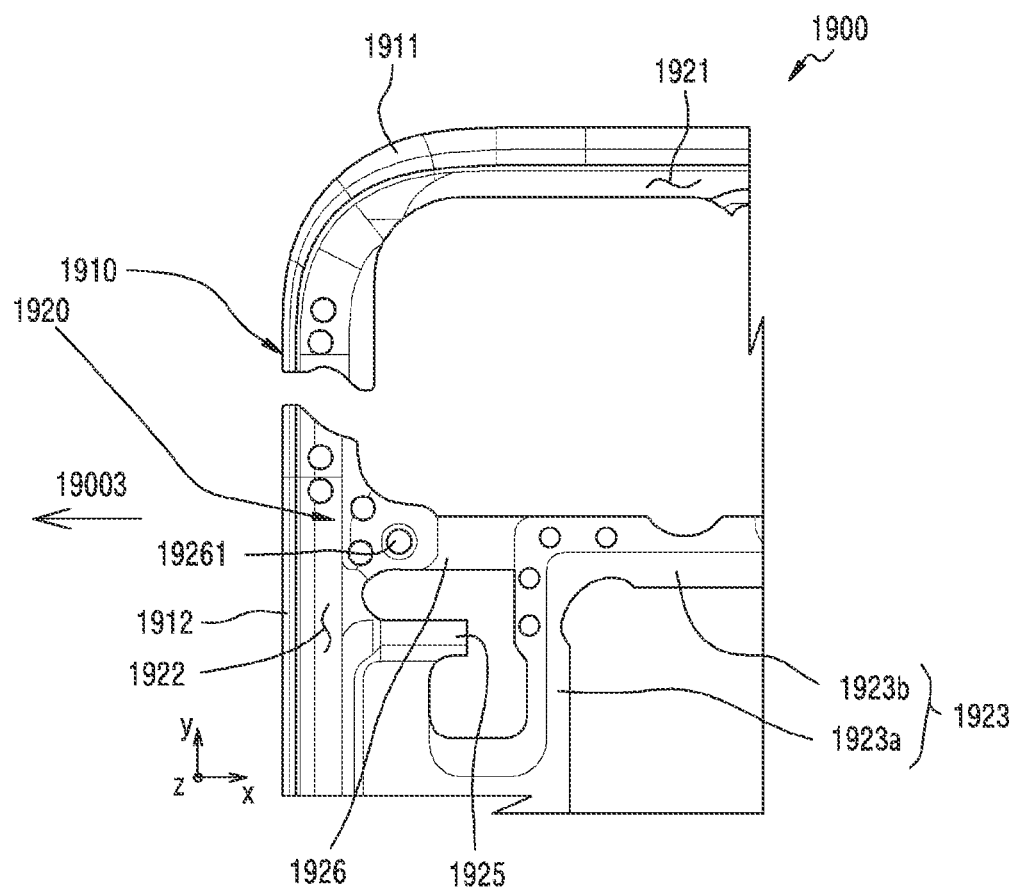
FIG. 19A illustrates an antenna structure according to an embodiment.

FIG. 19A illustrates an antenna structure according to an embodiment.

Referring to FIG. 19A, an antenna structure 1900 includes a side surface member 1910 and an inner conductive part 1920. The side surface member 1910 includes a first outer conductive part 1911 and a second outer conductive part 1912. The inner conductive part 1920 includes a first conductive area 1921, which is connected with the first outer conductive part 1911 adjacent thereto, a second conductive area 1922, which is connected with the second outer conductive part 1912 adjacent thereto, and a third conductive area 1923, which is connected with the first conductive area 1921.

At least a part of the second outer conductive part 1912 and at least a part of the second inner conductive area 1922 may operate as a first antenna radiator (e.g., the first antenna radiator ① of FIG. 5). At least a part of the first outer conductive part 1911 and at least a part of the first inner conductive part 9821 may operate as a second antenna radiator (e.g., the second antenna radiator ② of FIG. 5).

A first protrusion 1925 included in the second conductive area 1922 may be electrically connected with a wireless communication circuit disposed on a PCB, and may serve as a feeding structure for the first antenna radiator.

The antenna structure 1900 also includes an extended part 1926 to connect the second conductive area 1922 and the third conductive area 1923, which is different from the second protrusion 1726 of the antenna structure 1700 of FIG. 17A. The extended part 1926 includes at least one bolt fastening boss 19261. For example, the extended part 1926 may be extended from a first extended part 1923a of the third conductive area 1923 in a third direction 19003, and may be connected with the second conductive area 1922. The extended part 1926 may be extended from an area where the first extended part 1923a of the third conductive area 1923 and a second extended part 1923b meet each other in the third direction 19003, and may be connected with the second conductive area 1922.

Figure 19B:
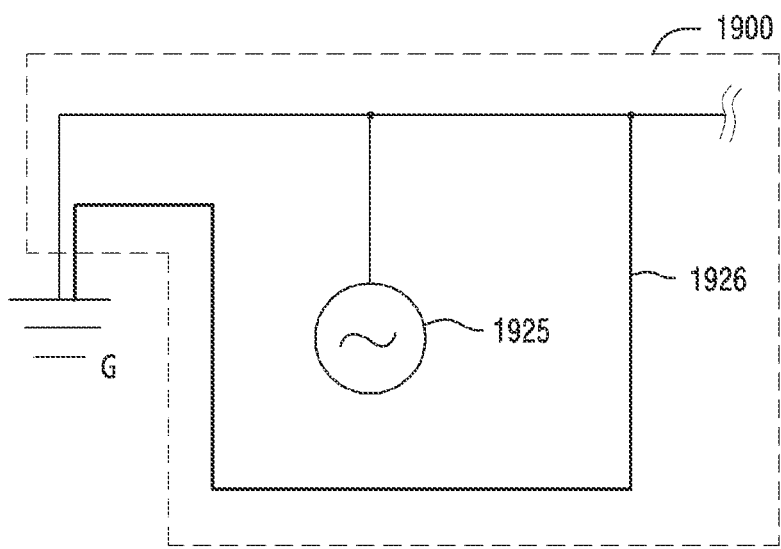
FIG. 19B illustrates an equivalent circuit concerning the antenna structure of FIG. 19A, according to an embodiment.

FIG. 19B illustrates an equivalent circuit concerning the antenna structure of FIG. 19A, according to an embodiment.

Referring to FIG. 19B, when the PCB and the antenna structure 1900 are coupled with each other, the extended part 1926 may be a ground line to electrically connect a ground G of the PCB and the antenna structure 1900.

Figure 20:
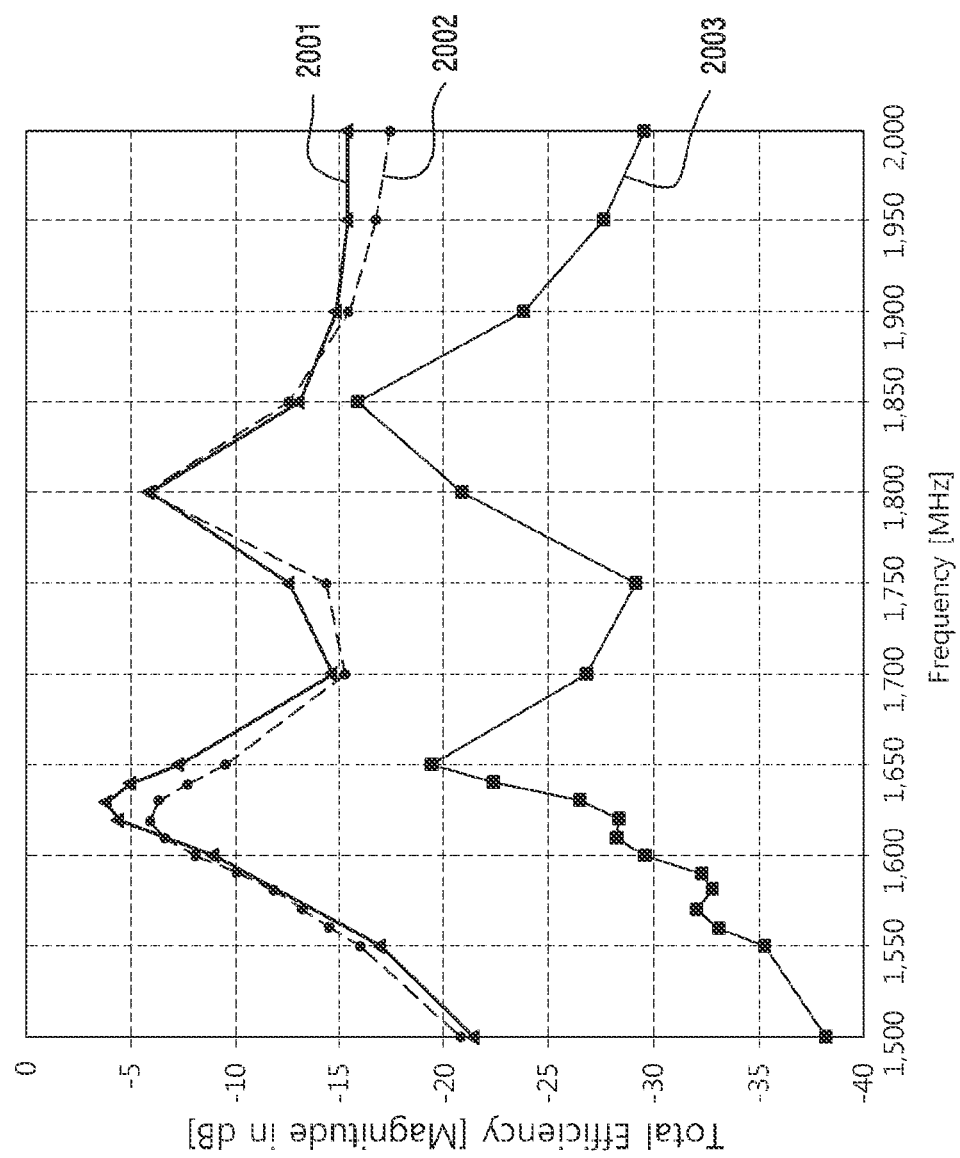
FIG. 20 is a graph illustrating antenna radiation performance on frequency distribution according to a shape of an antenna structure, according to an embodiment.

FIG. 20 is a graph illustrating antenna radiation performance on frequency distribution according to a shape of an antenna structure according to an embodiment. Referring to FIG. 20, reference numeral 2001 indicates antenna radiation performance concerning an antenna device implemented by the antenna structure 1700 of FIG. 17A, reference numeral 2002 indicates antenna radiation performance concerning an antenna device implemented by the antenna structure 1800 of FIG. 18A, and reference numeral 2003 indicates antenna radiation performance concerning an antenna device implemented by the antenna structure 1900 of FIG. 19A. Referring to reference numerals 2001, 2002, and 2003, the antenna radiation performance varies according to the second protrusion 1726 of FIG. 17A, the second protrusion 1826 of FIG. 18A, or the extended part 1926 of FIG. 19A.

Figure 21A:
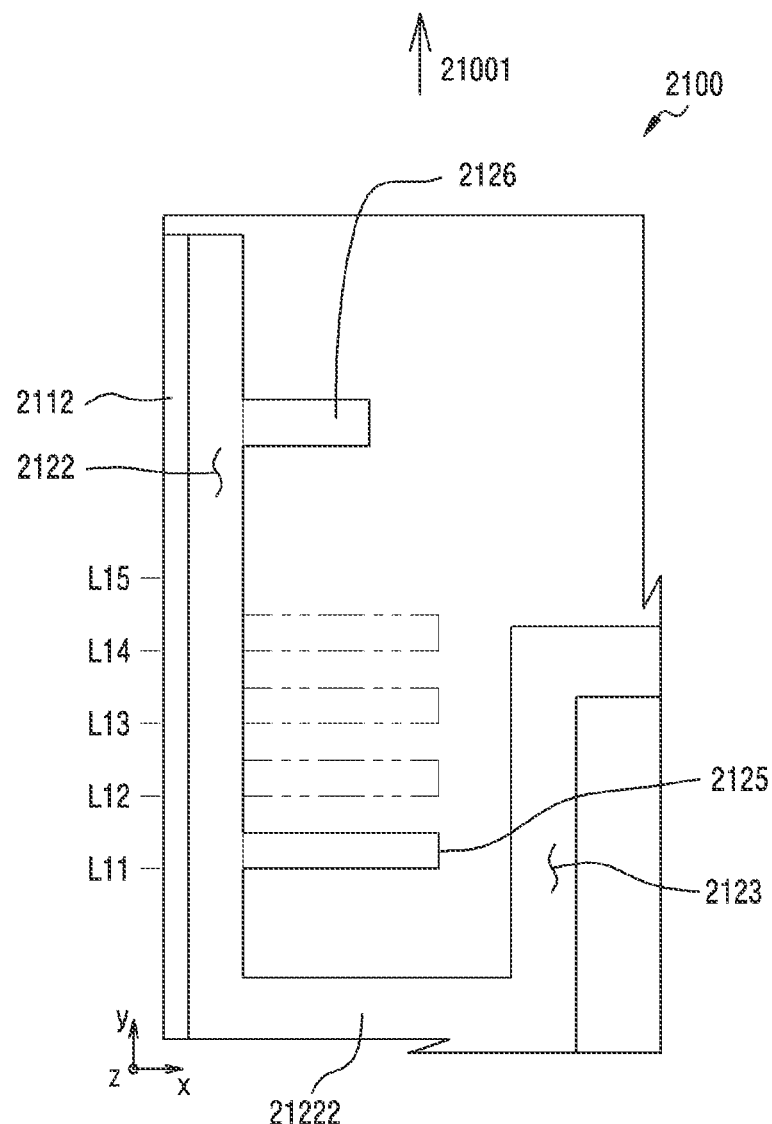
FIG. 21A illustrates a position of a first protrusion utilized as a feeding structure in an antenna structure according to an embodiment.

FIG. 21A illustrates a position of a first protrusion utilized as a feeding structure in an antenna structure according to an embodiment.

Referring to FIG. 21A, an antenna structure 2100 includes a second outer conductive part 2112, a second conductive area 2122, and a third conductive area 2123.

At least a part of the second outer conductive part 212 and at least a part of the second conductive area 2122 may operate as a first antenna radiator (e.g., the first antenna radiator ① of FIG. 5).

A first protrusion 2125 included in the second conductive area 2122 may be electrically connected with a wireless communication circuit disposed on a PCB, and may serve as a feeding structure for the first antenna radiator.

The first antenna radiator also includes a second protrusion 2126 included in the second conductive area 2122.

The first protrusion 2125 may be disposed on a first position L11, which is spaced apart from a seventh extended part 21222 of the second conductive area 2122 in a first direction 21001 by a first distance. Alternatively, the first protrusion 2125 may be disposed on a second position L12, which is further spaced apart in the first direction 21001 by about 1.25 mm, on a third position L13, which is further spaced apart in the first direction 21001 by about 2.5 mm, on a fourth position L14, which is further spaced apart in the first direction 21001 by about 3.75 mm, or on a fifth location L15, which is further spaced apart in the first direction by about 5.00 mm.

Figure 21B:
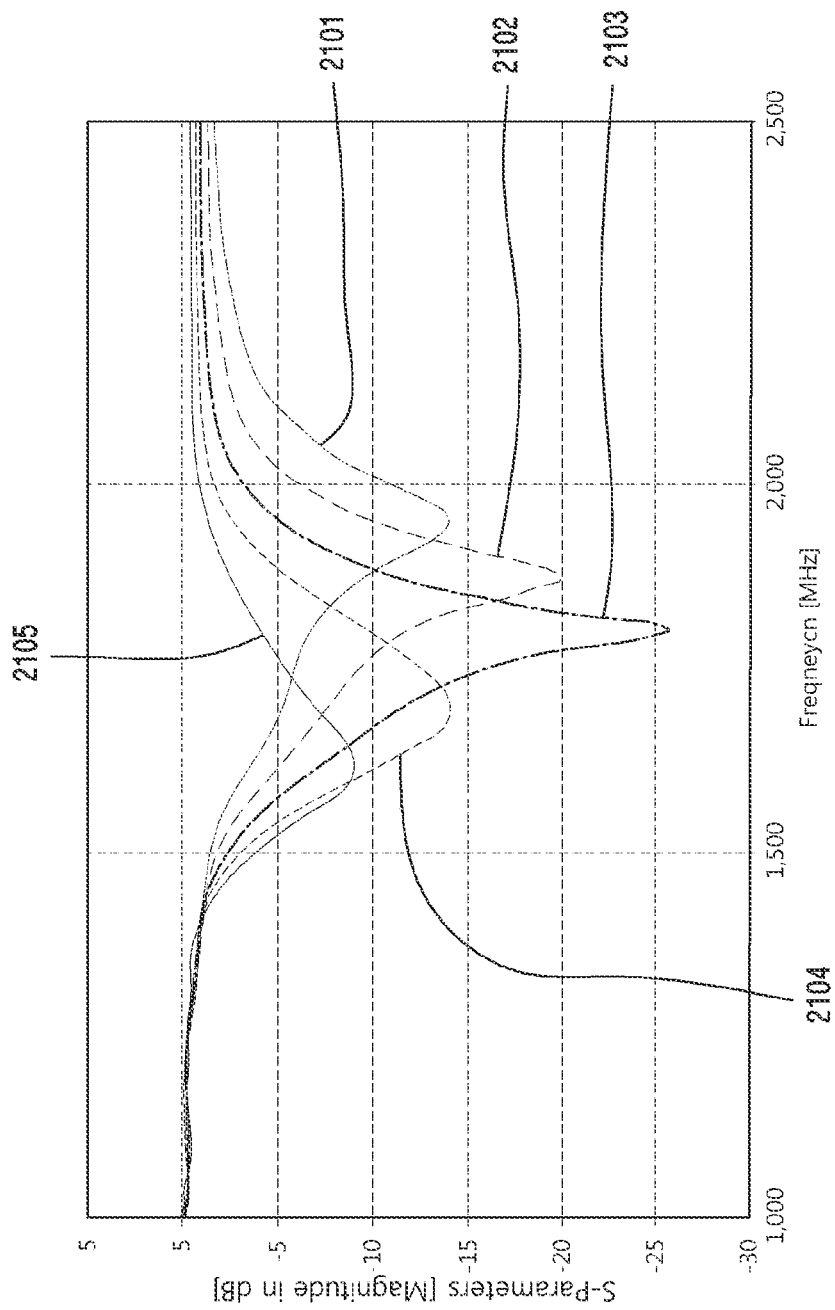
FIG. 21B is a graph illustrating a ratio of an output voltage to an input voltage on frequency distribution according to a position of the first protrusion of FIG. 19A, according to an embodiment.

FIG. 21B is a graph illustrating a ratio of an output voltage to an input voltage on frequency distribution according to a position of the first protrusion of FIG. 21A, according to an embodiment.

Referring to FIG. 21B, reference numeral 2101 indicates a ratio of an output voltage to an input voltage on frequency distribution (e.g., an S parameter) when the first protrusion 2125 is formed on the first position L11. Reference numeral 2102 indicates a ratio of an output voltage to an input voltage on frequency distribution when the first protrusion 2125 is formed on the second position L12. Reference numeral 2103 indicates a ratio of an output voltage to an input voltage on frequency distribution when the first protrusion 2125 is formed on the third position L13. Reference numeral 2104 indicates a ratio of an output voltage to an input voltage on frequency distribution when the first protrusion 2125 is formed on the fourth position L14. Reference numeral 2105 indicates a ratio of an output voltage to an input voltage on frequency distribution when the first protrusion 2125 is formed on the fifth position L15. Referring to reference numerals 2101, 2102, 2103, 2104, and 2105, a resonant frequency concerning an antenna radiator implemented by at least a part of the antenna structure 2100 may be shifted according to a position of the first protrusion 2125, which is utilized as the feeding structure.

Figure 22A:
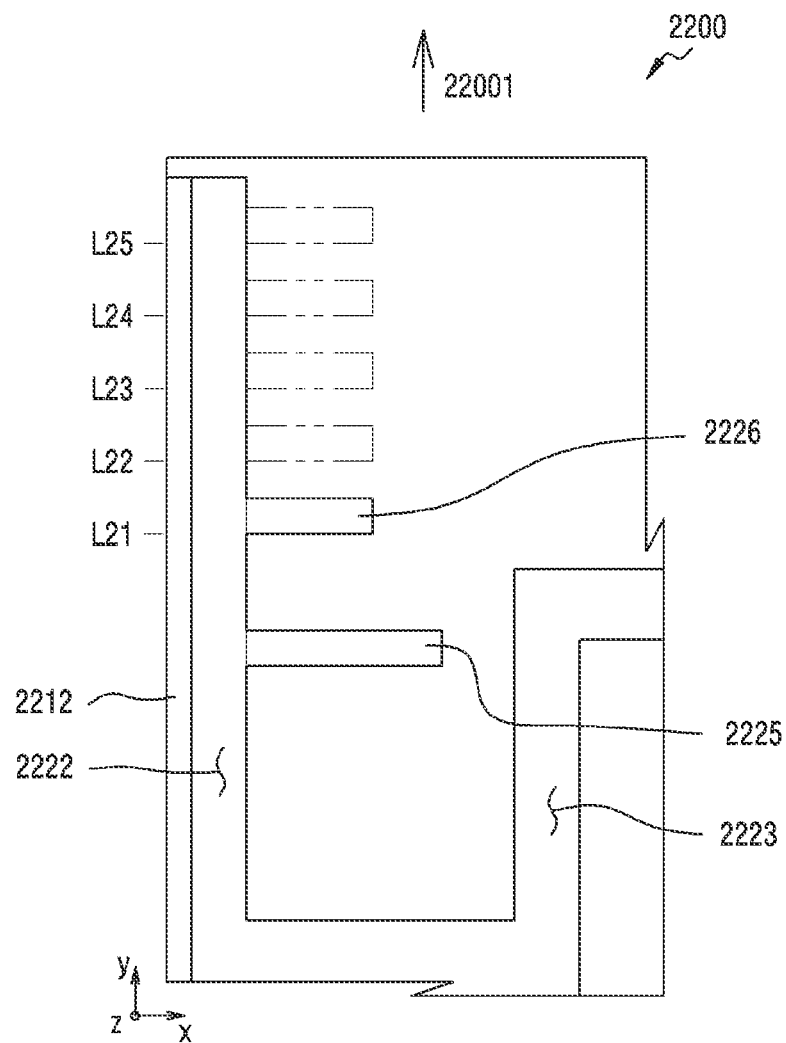
FIG. 22A illustrates a position of a second protrusion utilized as an antenna radiator in an antenna structure according to an embodiment.

FIG. 22A illustrates a position of a second protrusion utilized as an antenna radiator in an antenna structure according to an embodiment.

Referring to FIG. 22A, an antenna structure 2200 includes a second outer conductive part 2212, a second conductive area 2222, and a third conductive area 2223.

At least a part of the second outer conductive part 2212 and at least a part of the second conductive area 2222 may operate as a first antenna radiator (e.g., the first antenna radiator ① of FIG. 5).

A first protrusion 2225 included in the second conductive area 2222 may be electrically connected with a wireless communication circuit disposed on a PCB, and may serve as a feeding structure for the first antenna radiator.

The first antenna radiator also includes a second protrusion 2226 included in the second conductive area 2222. The second protrusion 2226 may be disposed on a first position L21, which is spaced apart from the first protrusion 2225 in a first direction 22001 by a first distance. Alternatively, the second protrusion 2226 may be disposed on a second position L22, which is further spaced apart in the first direction 22001 by about 1.25 mm, on a third position L23, which is further spaced apart in the first direction 22001 by about 2.5 mm, on a fourth position L24, which is further spaced apart in the first direction 21001 by about 3.75 mm, or on a fifth position L25, which is further spaced apart in the first direction 22001 by about 5.00 mm.

Figure 22B:
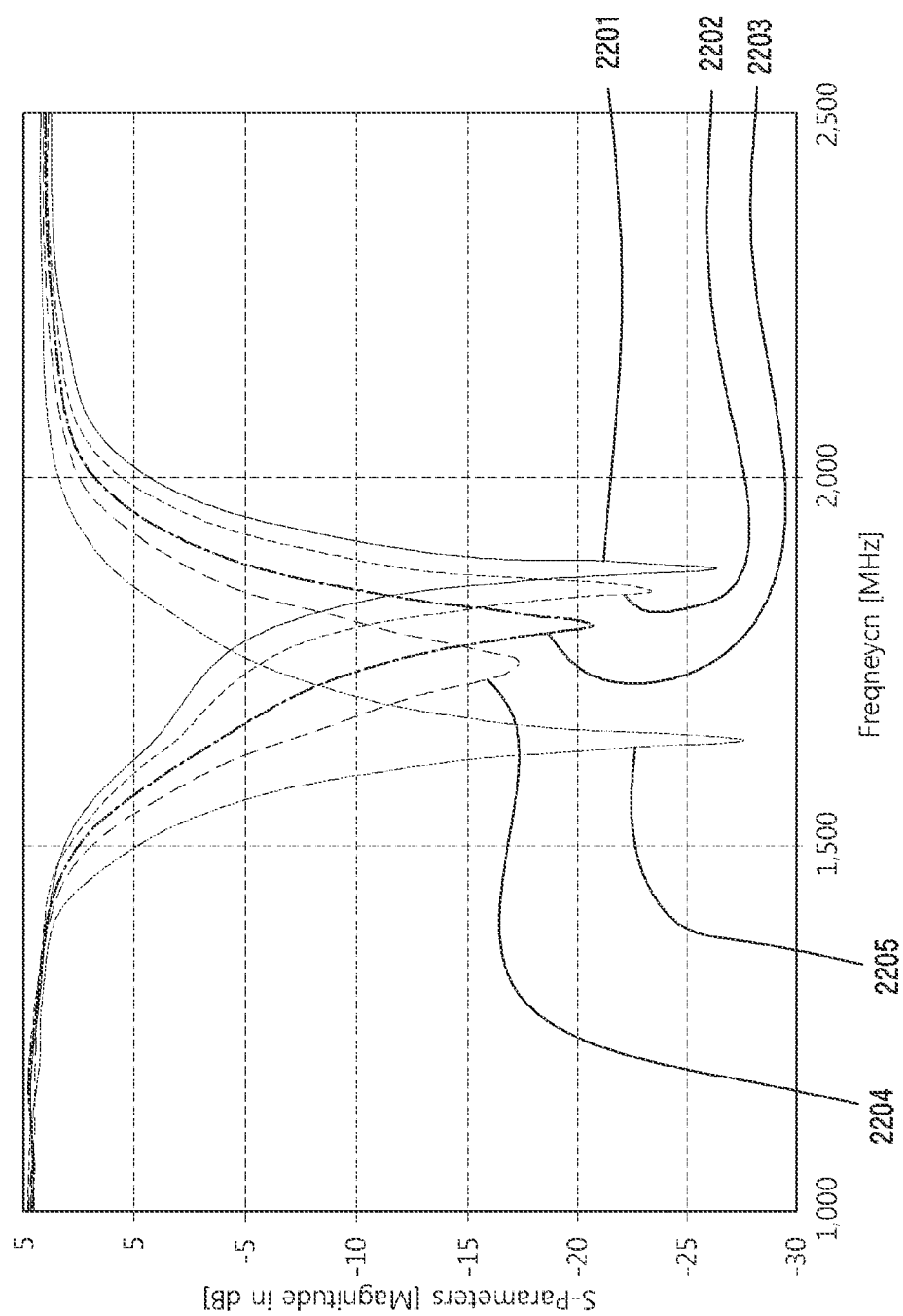
FIG. 22B is a graph illustrating a ratio of an output voltage to an input voltage on frequency distribution according to a position of the second protrusion of FIG. 22A, according to an embodiment.

FIG. 22B is a graph illustrating a ratio of an output voltage to an input voltage on frequency distribution according to a position of the second protrusion of FIG. 22B, according to an embodiment.

Referring to FIG. 22B, reference numeral 2201 indicates a ratio of an output voltage to an input voltage on frequency distribution (e.g., an S parameter) when the second protrusion 2226 is formed on the first position L21. Reference numeral 2202 indicates a ratio of an output voltage to an input voltage on frequency distribution when the second protrusion 2226 is formed on the second position L22. Reference numeral 2203 indicates a ratio of an output voltage to an input voltage on frequency distribution when the second protrusion 2226 is formed on the third position L23. Reference numeral 2204 indicates a ratio of an output voltage to an input voltage on frequency distribution when the second protrusion 2226 is formed on the fourth position L24. Reference numeral 2205 indicates a ratio of an output voltage to an input voltage on frequency distribution when the second protrusion 2226 is formed on the fifth position L25. Referring to reference numerals 2201, 2202, 2203, 2204, and 2205, a resonant frequency concerning an antenna radiator implemented by at least a part of the antenna structure 2200 may be shifted according to a position of the second protrusion 2226, which is utilized as a feeding structure.

Figure 23:
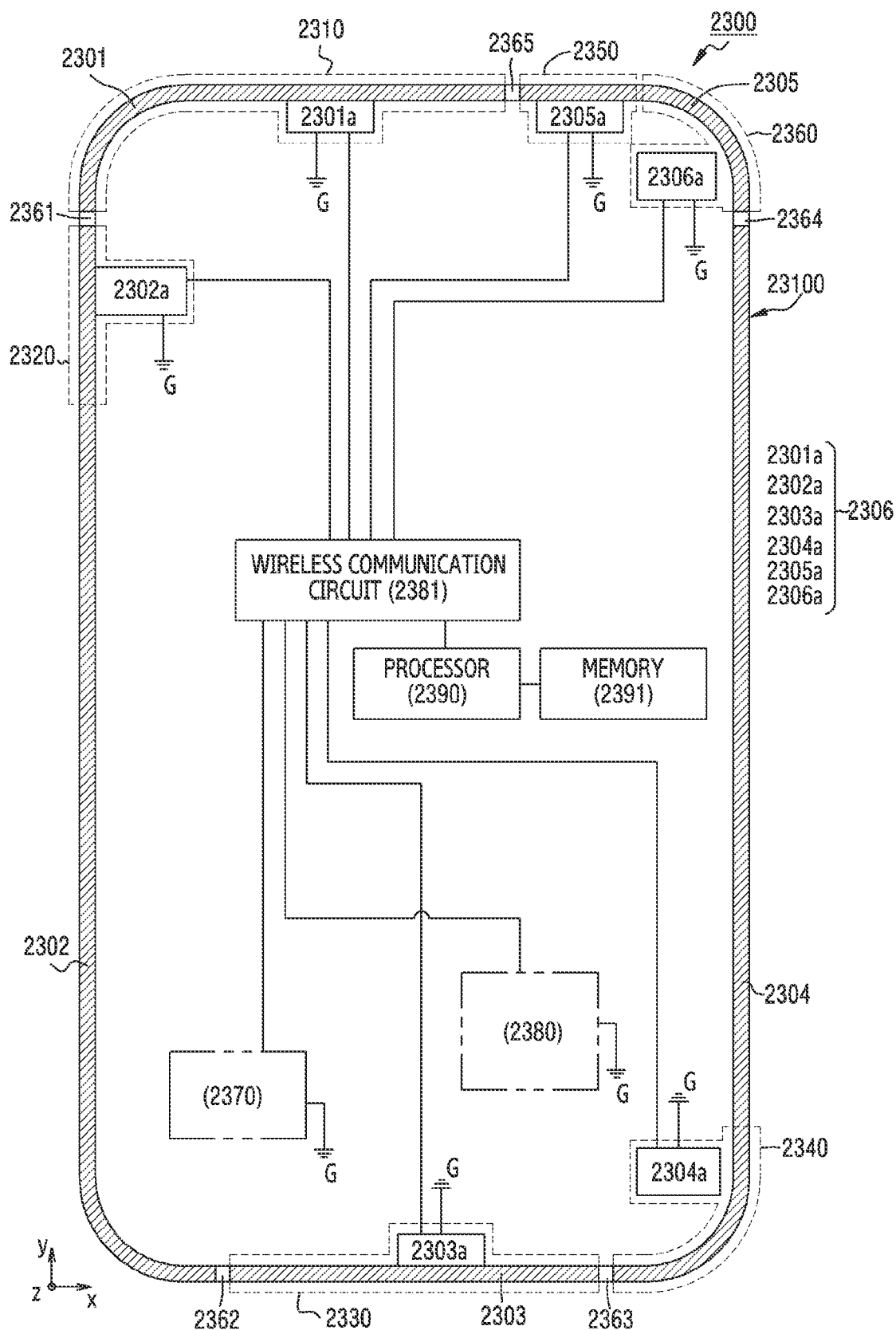
FIG. 23 illustrates an electronic device according to an embodiment.

FIG. 23 illustrates an electronic device according to an embodiment.

Referring to FIG. 23, an electronic device 2300 includes a side surface member 23100, an inner conductive part 2306, a wireless communication circuit 2381, and a processor 2390.

The side surface member 23100 includes a first outer conductive part 2301, a second outer conductive part 2302, a third outer conductive part 2303, a fourth outer conductive part 2304, and a fifth outer conductive part 2305.

The electronic device 2300 includes a first insulation part 2361 disposed between the first and second outer conductive parts 2301 and 2302, a second insulation part 2362 disposed between the second and third outer conductive parts 2302 and 2303, a third insulation part 2363 disposed between the third and fourth outer conductive parts 2303 and 2304, a fourth insulation part 2364 disposed between the fourth and fifth outer conductive parts 2304 and 2305, and a fifth insulation part 2365 disposed between the first and fifth outer conductive parts 2301 and 2305.

The inner conductive part 2306 includes a first inner conductive part 2301a, a second inner conductive part 2302a, a third inner conductive part 2303a, a fourth inner conductive part 2304a, a fifth inner conductive part 2305a, and a sixth inner conductive part 2306a.

At least a part of the second outer conductive part 2302 and at least a part of the second inner conductive part 2302a may form a second conductive part 2320, which operates as a first antenna radiator (e.g., the first antenna radiator of FIG. 5). The second inner conductive part 2302a may be electrically connected with the wireless communication circuit 2381 at at least one feeding point. The second inner conductive part 2302a may be electrically connected with a ground G of a PCB at at least one grounding point.

At least a part of the first outer conductive part 2301 and at least a part of the first inner conductive part 2301a may form a first conductive part 2310, which operates as a second antenna radiator (e.g., the second antenna radiator ② of FIG. 5). The first inner conductive part 2301a may be electrically connected with the wireless communication circuit 2381 at at least one feeding point. The first inner conductive part 2301a may be electrically connected with the ground G of the PCB at at least one grounding point.

At least a part of the fifth outer conductive part 2305 and at least a part of the fifth inner conductive part 2305a may form a fifth conductive part 2350, which operates as a third antenna radiator (e.g., the third antenna radiator ③ of FIG. 5). The fifth inner conductive part 2305a may be electrically connected with the wireless communication circuit 2381 at at least one feeding point. The fifth inner conductive part 2305a may be electrically connected with the ground G of the PCB at at least one grounding point.

At least a part of the third outer conductive part 2303 and at least a part of the third inner conductive part 2303a may form a third conductive part 2330, which operates as a fourth antenna radiator (e.g., the fourth antenna radiator ④ of FIG. 5). The third inner conductive part 2303a may be electrically connected with the wireless communication circuit 2381 at at least one feeding point. The third inner conductive part 2303a may be electrically connected with the ground G of the PCB at at least one grounding point.

At least a part of the fourth outer conductive part 2304 and at least a part of the fourth inner conductive part 2304a may form a fourth conductive part 2340, which operates as a fifth antenna radiator (e.g., the fifth antenna radiator ⑤ of FIG. 5). The fifth inner conductive part 2305a may be electrically connected with the wireless communication circuit 2381 at at least one feeding point. The fourth inner conductive part 2304a may be electrically connected with the ground G of the PCB at at least one grounding point.

At least a part of the fifth outer conductive part 2304 and at least a part of the sixth inner conductive part 2306a may form a sixth conductive part 2360, which operates as a sixth antenna radiator (e.g., the sixth antenna radiator ⑥ of FIG. 5). The sixth inner conductive part 2306a may be electrically connected with the wireless communication circuit 2381 at at least one feeding point. The sixth inner conductive part 2306a may be electrically connected with the ground G of the PCB at at least one grounding point.

The wireless communication circuit 2381 may provide a radiation current (or a wireless signal) to at least one antenna radiator (e.g., the first conductive part 2310, the second conductive part 2320, the third conductive part 2330, the fourth conductive part 2340, the fifth conductive part 2350, or the sixth conductive part 2360), and the radiation current may be transmitted along at least one antenna radiator. Accordingly, the wireless communication circuit 2381 may transmit or receive radio electromagnetic waves through at least one antenna radiator.

The electronic device 2300 may further include a seventh conductive part 2370, which is disposed inside the electronic device 2300 and is electrically connected with the wireless communication circuit 2381, and operates as a seventh antenna radiator. The electronic device 2300 may also include an eighth conductive part 2380, which is disposed inside the electronic device 2300 and is electrically connected with the wireless communication circuit 2381, and operates as an eighth antenna radiator. The seventh conductive part 2370 and/or the eighth conductive part 2380 may be electrically connected with a ground G. The seventh conductive part 2370 and/or the eighth conductive part 2380 may not be electrically connected with the ground G.

The seventh conductive part 2370 and/or the eighth conductive part 2380 may be implemented by LDS. For example, the seventh conductive part 2370 or the eighth conductive part 2308 may be formed by designing a pattern on a structure disposed inside the electronic device 2300 by using lasers, and plating over the pattern with a conductive material such as copper or nickel. A structure in which the seventh conductive part 2370 or the eighth conductive part 2380 is disposed may include a structure formed by polymer, such as polycarbonate.

The seventh conductive part 2370 or the eighth conductive part 2380 may include a microstrip (e.g., a patch antenna) formed on the PCB. The seventh conductive part 2380 or the eighth conductive part 2380 may be implemented by various other antennas.

Referring to FIG. 5, when viewed above the front surface of the electronic device 2300, the seventh conductive part 2370 or the eighth conductive part 2380 may be positioned, spaced apart from the second center C2 in the second direction 5002. When viewed above the front surface of the electronic device 2300, the seventh conductive part 2370 may be disposed closer to the third side surface 5013, compared to the eighth conductive part 2380. When viewed above the front surface of the electronic device 2300, the seventh conductive part 2370 may be disposed closer to the second side surface 5012, compared to the eighth conductive part 2380. The seventh conductive part 2370 or the eighth conductive part 2380 may be positioned, spaced apart from the second center C2 in the first direction 5001. Alternatively, one or all of the seventh conductive part 2370 and the eighth conductive part 2380 may be omitted.

Referring again to FIG. 23, the wireless communication circuit 2381 may include at least one of a cellular module, a Wi-Fi module, a Bluetooth™ module, a GNSS module (for example, a GPS module, a Glonass module, a Beidou module, or a Galileo module), an NFC module, an RF module. Each of the Wi-Fi module, the Bluetooth™ module, the GNSS module, or the NFC module may include a processor for processing data which is transmitted and received through a corresponding module. At least some (e.g., two or more) of the cellular module, the Wi-Fi module, the Bluetooth™ module, the GNSS module, or the NFC module may be included in one integrated chip (IC) or an IC package.

The wireless communication circuit 2381 (e.g., the RF module) may transmit and receive a wireless communication signal such as an RF signal through at least one antenna radiator (e.g., the first conductive part 2310, the second conductive part 2320, the third conductive part 2330, the fourth conductive part 2340, the fifth conductive part 2350, the sixth conductive part 2360, the seventh conductive part 2370, or the eighth conductive part 2380). The wireless communication circuit 2381 may include at least one of a transceiver, a power amp module (PAM), a frequency filter, or a low noise amplifier (LNA). The wireless communication circuit 2381 may include various RF components (e.g., an RFIC and/or a front end module (FEM)) between at least one antenna radiator and the processor 2390. At least one of the cellular module, the Wi-Fi module, the Bluetooth™ module, the GNSS module, or the NFC module may transmit and receive RF signals through a separate RF module.

When receiving a wireless signal, the wireless communication circuit 2381 may receive the wireless signal from at least one antenna radiator (e.g., the first conductive part 2310, the second conductive part 2320, the third conductive part 2330, the fourth conductive part 2340, the fifth conductive part 2350, the sixth conductive part 2360, the seventh conductive part 2370, and/or the eighth conductive part 2380), and may convert the received wireless signal into a baseband signal and may transmit the converted baseband signal to the processor 2390. The processor 2390 may process the received baseband signal, and may control a human interface or a mechanical interface of the electronic device 2300 corresponding to the received baseband signal. When transmitting a wireless signal, the processor 2390 may generate a baseband signal and may output the baseband signal to the wireless communication circuit 2381. The wireless communication circuit 2381 may receive the baseband signal from the processor 2390, may convert the received baseband signal into a wireless signal, and may transmit the wireless signal to the air through at least one antenna radiator.

The wireless communication circuit 2381 may process a transmission signal or a reception signal in at least one designated frequency band by using at least one antenna radiator. For example, the designated frequency band may include at least one of a low band (LB) (about 600-1 GHz), a middle band (MB) (about 1-2.3 GHz), a high band (HB) (about 2.3-2.7 GHz) or a ultra high band (UHB) (about 2.7-6 GHz).

The wireless communication circuit 2381 may support at least one communication technique from among single input multiple output (SIMO), multiple input single output (MISO), diversity, or multiple input multiple output (MIMO) by using at least one antenna radiator (e.g., the first conductive part 2310, the second conductive part 2320, the third conductive part 2330, the fourth conductive part 2340, the fifth conductive part 2350, the sixth conductive part 2360, the seventh conductive part 2370, and/or the eighth conductive part 2380).

The wireless communication circuit 2381 or the processor 2390 may transmit or receive data through the MIMO technique by using a plurality of antenna radiators in a communication mode in which a corresponding frequency band is used. The electronic device 2300 may include a memory 2391 electrically connected with the processor 2390. The memory 2391 may store instructions that cause the processor 2390 to transmit or receive data through the MIMO technique by selectively using a plurality of conductive parts from among the first conductive part 2310, the second conductive part 2320, the third conductive part 2330, the fourth conductive part 2340, the fifth conductive part 2350, the sixth conductive part 2360, the seventh conductive part 2370, or the eighth conductive part 2380, based on the communication mode.

The MIMO technique may include a 'beam forming' method which removes ambient interference by adjusting a signal strength according to positions angles of a base station (or a transmitter) and a user by adjusting phase information of each antenna radiator, and enhances performance. The MIMO technique may include a 'diversity' method which enhances performance by having a distance between antenna radiators to independently make a signal between the antenna radiators. The MIMO technique may include a 'multiplexing' method which makes a virtual auxiliary channel between transmission reception antenna radiators, and increases a transmission speed by transmitting different data through respective transmission antennas. A technique by which a base station transmits different data through respective transmission antennas, and the electronic device 2300 classifies the transmission data through appropriate signal processing may be utilized. For example, a 4×4 MIMO technique may utilize four antennas in a base station (or a transmitter) and the electronic device 2300 (or receiver).

In a communication mode in which MB is used, the wireless communication circuit 2381 or the processor 2390 may transmit or receive data in the MIMO technique through the second conductive part 2320, the third conductive part 2330, the fifth conductive part 2350, and the eighth conductive part 2380. The wireless communication circuit 2381 may transmit or receive signals of different frequencies in the MB through the second conductive part 2320, the third conductive part 2330, the fifth conductive part 2350, and the eighth conductive part 2380. The second conductive part 2320 and the fifth conductive part 2350 may operate as diversity antennas.

In a communication mode in which HB is used, the wireless communication circuit 2381 or the processor 2390 may transmit or receive data in the MIMI technique through the first conductive part 2310, the fourth conductive part 2340, the fifth conductive part 2350, and the seventh conductive part 2370. The wireless communication circuit 2381 may transmit or receive signals of different frequencies in the HB through the first conductive part 2310, the fourth conductive part 2340, the fifth conductive part 2350, and the seventh conductive part 2370. The first conductive part 2310 and the fifth conductive part 2350 may operate as diversity antennas.

In a communication mode in which HB is used, the wireless communication circuit 2381 or the processor 2390 may transmit or receive data in the MIMO technique through the second conductive part 2320, the fourth conductive part 2340, the fifth conductive part 2350, and the seventh conductive part 2370. The wireless communication circuit 2381 may transmit or receive signals of different frequencies in the HB through the second conductive part 2320, the fourth conductive part 2340, the fifth conductive part 2350, and the seventh conductive part 2370. The second conductive part 2320 and the fifth conductive part 2350 may operate as diversity antennas.

According to an embodiment, an electronic device may include an antenna structure. The antenna structure may include a side surface member including a first conductive part, a second conductive part, a third conductive part, a fourth conductive part, and a fifth conductive part which at least partially surround a space between a first surface and a second surface facing in the opposite directions. The antenna structure may include a first insulation part between the first conductive part and the second conductive part, a second insulation part between the second conductive part and the third conductive part, a third insulation part between the third conductive part and the fourth conductive part, a fourth insulation part between the fourth conductive part and the fifth conductive part, and a fifth insulation part between the first conductive part and the fifth conductive part. The first conductive part may form a part of a first side surface facing in a first direction and a part of a third side surface facing in a third direction which is perpendicular to the first direction. The second conductive part may form a part of the third side surface and a part of a second side surface facing in a second direction which is opposite to the first direction. The third conductive part may form a part of the second side surface. The fourth conductive part may form a part of the second side surface and a part of a fourth side surface facing in a fourth direction which is opposite to the third direction. The fifth conductive part may form a part of the first side surface and a part of the fourth side surface. The electronic device may include a display which is disposed between the first surface and the second surface and is exposed through the first surface. The electronic device may include a wireless communication circuit which is electrically connected with the first conductive part, the second conductive part, the third conductive part, the fourth conductive part, and the fifth conductive part, and is configured to transmit and/or receive signals of different frequencies in a designated frequency band. The second conductive part may include a feeding structure which at least partially overlaps the display in the proximity of the first insulation part when viewed above the first surface, and is electrically connected with the wireless communication circuit.

The display may include a ground layer which at least partially overlaps the feeding structure when viewed above the second surface.

The second conductive part may form a plurality of resonant frequencies in the designated frequency band by the ground layer of the display.

The electronic device may further include a nonconductive bonding member which is disposed between an edge part of the display and the antenna structure to make the feeding structure be spaced apart from the display.

The first insulation part may be disposed in the proximity of a corner which connects the first conductive part and the second conductive part.

The electronic device may further include a PCB which is disposed between the first surface and the second surface and includes at least one ground layer.

The first conductive part, the second conductive part, the third conductive part, the fourth conductive part, or the fifth conductive part may be electrically connected with the at least one ground layer.

The electronic device may further include a ground member which is disposed in the proximity of a corner which connects the first conductive part and the second conductive part when viewed above the first surface. The ground member may not overlap the first conductive part, the second conductive part, or the PCB when viewed above the first surface.

The ground member may be a ground layer that is included in a camera module electrically connected with the PCB.

The feeding structure may overlap some area of the PCB when viewed above the first surface, and the electronic device may further include a flexible conductive member which is disposed between the feeding structure and the PCB to electrically connect between the feeding structure and the PCB.

The second conductive part may further include a protrusion which at least partially overlaps the display in part in the proximity of the first insulation part when viewed above the first surface, and protrudes and is extended in the fourth direction.

The protrusion may include a bolt fastening boss.

The second conductive part may further include a first space which is recessed between the feeding structure and the protrusion in the third direction when viewed above the first surface.

The second conductive part may further include a second space which is disposed, spaced apart from the first space in the second direction when viewed above the first surface, and is recessed in the third direction. The feeding structure may be disposed between the first space and the second space when viewed above the first surface.

The antenna structure may further include a conductive area to connect the first conductive part, the second conductive part, the third conductive part, the fourth conductive part, and the fifth conductive part between the first surface and the second surface.

The electronic device may further include a sixth conductive part and a seventh conductive part which are separated from the antenna structure between the first surface and the second surface, and are electrically connected with the wireless communication circuit. The sixth conductive part may be disposed closer to the third surface than the seventh conductive part. The sixth conductive part and the seventh conductive part may be disposed closer to the second surface out of the first surface and the second surface.

The wireless communication circuit may transmit and/or receive signals of different frequencies in a designated first frequency band through the second conductive part, the third conductive part, the fifth conductive part, and the seventh conductive part.

The designated first frequency band may be 1 GHz to 2.3 GHz.

The wireless communication circuit may transmit and/or receive signals of different frequencies in a designated second frequency band through one of the first conductive part and the second conductive part, the fourth conductive part, the fifth conductive part, and the sixth conductive part.

The designated second frequency band may be 2.3 GHz to 2.7 GHz.

According to an embodiment, an electronic device may include an antenna structure. The antenna structure may include a side surface member including a first conductive part, a second conductive part, a third conductive part, a fourth conductive part, and a fifth conductive part which at least partially surround a space between a first surface and a second surface facing in the opposite directions. The antenna structure may include a first insulation part between the first conductive part and the second conductive part, a second insulation part between the second conductive part and the third conductive part, a third insulation part between the third conductive part and the fourth conductive part, a fourth insulation part between the fourth conductive part and the fifth conductive part, and a fifth insulation part between the first conductive part and the fifth conductive part. The first conductive part may form a part of a first side surface facing in a first direction and a part of a third side surface facing in a third direction which is perpendicular to the first direction. The second conductive part may form a part of the third side surface and a part of a second side surface facing in a second direction which is opposite to the first direction. The third conductive part may form a part of the second side surface. The fourth conductive part may form a part of the second side surface and a part of a fourth side surface facing in a fourth direction which is opposite to the third direction. The fifth conductive part may form a part of the first side surface and a part of the fourth side surface. The electronic device may include a display which is disposed between the first surface and the second surface and is exposed through the first surface. The electronic device may include a wireless communication circuit which selects four conductive parts from among the first conductive part, the second conductive part, the third conductive part, the fourth conductive part, and the fifth conductive part, and is configured to receive a designated frequency signal through the four selected conductive parts.

The designated frequency signal may be included in 1 GH to 2.3 GHz, 2.3 GHz to 2.7 GHz, or 2.7-6 GHz.

Embodiments of the disclosure described above are merely specific examples to easily explain the technical features according to embodiments of the disclosure and to assist in understanding embodiment of the disclosure, and are not included to limit the scope of the embodiments of the disclosure. Accordingly, all changes or modified forms derived based on the technical concept of various embodiments of the disclosure should be interpreted as being included in the scope of the various embodiments.

According to various embodiments, when at least a part of a housing of a metallic material is utilized as an antenna radiator, a bandwidth can be expanded by using an electric material (e.g., a display) or a conductive structure in the proximity of the housing.

While the disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. An electronic device, comprising:
    an antenna structure including:
        a side surface member including a first conductive part, a second conductive part, a third conductive part, a fourth conductive part, and a fifth conductive part, which at least partially surround a space between a first surface and a second surface facing in the opposite directions,
        a first insulation part between the first conductive part and the second conductive part,
        a second insulation part between the second conductive part and the third conductive part,
        a third insulation part between the third conductive part and the fourth conductive part,
        a fourth insulation part between the fourth conductive part and the fifth conductive part,
        a fifth insulation part between the first conductive part and the fifth conductive part, and
        a sixth conductive part and a seventh conductive part, which are separated from the antenna structure between the first surface and the second surface, and are electrically connected with the wireless communication circuit,
    wherein the first conductive part forms a part of a first side surface facing in a first direction and a part of a third side surface facing in a third direction perpendicular to the first direction,
    wherein the second conductive part forms a part of the third side surface and a part of a second side surface facing in a second direction opposite to the first direction,
    wherein the third conductive part forms a part of the second side surface,
    wherein the fourth conductive part forms a part of the second side surface and a part of a fourth side surface facing in a fourth direction opposite to the third direction,
    wherein the fifth conductive part forms a part of the first side surface and a part of the fourth side surface,
    wherein the sixth conductive part is disposed closer to the third side surface than the seventh conductive part, and
    wherein the sixth conductive part and the seventh conductive part are disposed closer to the second side surface than the first side surface;
    a display disposed between the first surface and the second surface and exposed through the first surface; and
    a wireless communication circuit electrically connected with the first conductive part, the second conductive part, the third conductive part, the fourth conductive part, and the fifth conductive part, and configured to transceive in a designated frequency band,
    wherein the second conductive part includes a feeding structure that at least partially overlaps the display within a predetermined distance of the first insulation part, when viewed above the first surface, and is electrically connected with the wireless communication circuit.

2. The electronic device of claim 1, wherein the display includes a ground layer at least partially overlapping the feeding structure when viewed above the second surface.

3. The electronic device of claim 2, wherein the second conductive part forms a plurality of resonant frequencies in the designated frequency band by the ground layer of the display.

4. The electronic device of claim 1, further comprising a nonconductive bonding member disposed between an edge part of the display and the antenna structure, spacing the feeding structure apart from the display.

5. The electronic device of claim 1, wherein the first insulation part is disposed within a second predetermined distance of a corner that connects the first conductive part and the second conductive part.

6. The electronic device of claim 1, further comprising a printed circuit board (PCB) disposed between the first surface and the second surface,
    wherein the PCB includes at least one ground layer.

7. The electronic device of claim 6, wherein the first conductive part, the second conductive part, the third conductive part, the fourth conductive part, or the fifth conductive part is electrically connected with the at least one ground layer.

8. The electronic device of claim 6, further comprising a ground member disposed within a second predetermined distance of a corner that connects the first conductive part and the second conductive part when viewed above the first surface,
    wherein the ground member does not overlap the first conductive part, the second conductive part, or the PCB when viewed above the first surface.

9. The electronic device of claim 6, wherein the feeding structure overlaps at least a portion of the PCB when viewed above the first surface, and
    wherein the electronic device further comprises a flexible conductive member disposed between the feeding structure and the PCB to electrically connect the feeding structure and the PCB.

10. The electronic device of claim 1, wherein the second conductive part further includes a protrusion that at least partially overlaps the display in part within a second predetermined distance of the first insulation part when viewed above the first surface, and wherein the second conductive part protrudes and is extended in the fourth direction.

11. The electronic device of claim 10, wherein the second conductive part further includes a first space recessed between the feeding structure and the protrusion in the third direction when viewed above the first surface.

12. The electronic device of claim 1, wherein the antenna structure further includes a conductive area connecting the first conductive part, the second conductive part, the third conductive part, the fourth conductive part, and the fifth conductive part between the first surface and the second surface.

13. The electronic device of claim 1, wherein the wireless communication circuit is further configured to transceive signals of different frequencies in a designated first frequency band through the second conductive part, the third conductive part, the fifth conductive part, and the seventh conductive part.

14. The electronic device of claim 1, wherein the wireless communication circuit is further configured to transceive signals of different frequencies in a designated second frequency band through one of the first conductive part and the second conductive part, the fourth conductive part, the fifth conductive part, and the sixth conductive part.

15. An electronic device, comprising:
   an antenna structure, wherein the antenna structure includes:
      a side surface member including a first conductive part, a second conductive part, a third conductive part, a fourth conductive part, and a fifth conductive part, which at least partially surround a space between a first surface and a second surface facing in opposite directions,
      a first insulation part between the first conductive part and the second conductive part,
      a second insulation part between the second conductive part and the third conductive part,
      a third insulation part between the third conductive part and the fourth conductive part,
      a fourth insulation part between the fourth conductive part and the fifth conductive part,
      a fifth insulation part between the first conductive part and the fifth conductive part, and
      a sixth conductive part and a seventh conductive part, which are separated from the antenna structure between the first surface and the second surface, and are electrically connected with the wireless communication circuit,
   wherein the first conductive part forms a part of a first side surface facing in a first direction and a part of a third side surface facing in a third direction, which is perpendicular to the first direction,
   wherein the second conductive part forms a part of the third side surface and a part of a second side surface facing in a second direction, which is opposite to the first direction,
   wherein the third conductive part forms a part of the second side surface,
   wherein the fourth conductive part forms a part of the second side surface and a part of a fourth side surface facing in a fourth direction, which is opposite to the third direction,
   wherein the fifth conductive part forms a part of the first side surface and a part of the fourth side surface,
   wherein the sixth conductive part is disposed closer to the third side surface than the seventh conductive part, and
   wherein the sixth conductive part and the seventh conductive part are disposed closer to the second side surface than the first side surface;
   a display disposed between the first surface and the second surface and being exposed through the first surface; and
   a wireless communication circuit configured to:
      select four conductive parts from among the first conductive part, the second conductive part, the third conductive part, the fourth conductive part, and the fifth conductive part, and
      receive a designated frequency signal through the four selected conductive parts.

16. The electronic device of claim 15, wherein the designated frequency signal is included in 1 GHz to 2.3 GHz, 2.3 GHz to 2.7 GHz, or 2.7 to 6 GHz.

* * * * *